United States Patent
Kim et al.

(10) Patent No.: US 9,877,267 B2
(45) Date of Patent: Jan. 23, 2018

(54) METHOD FOR TERMINAL CLUSTERING IN WIRELESS COMMUNICATION SYSTEM SUPPORTING DEVICE-TO-DEVICE COMMUNICATION AND APPARATUS THEREFOR

(71) Applicants: LG ELECTRONICS INC., Seoul (KR); SEOUL NATIONAL UNIVERSITY R&DB FOUNDATION, Seoul (KR)

(72) Inventors: Hakseong Kim, Seoul (KR); Seonik Seong, Seoul (KR); Kwangbok Lee, Seoul (KR); Sunghyun Choi, Seoul (KR)

(73) Assignees: LG ELECTRONICS INC., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 15/521,258

(22) PCT Filed: Oct. 23, 2015

(86) PCT No.: PCT/KR2015/011277
§ 371 (c)(1),
(2) Date: Apr. 21, 2017

(87) PCT Pub. No.: WO2016/064243
PCT Pub. Date: Apr. 28, 2016

(65) Prior Publication Data
US 2017/0311227 A1 Oct. 26, 2017

Related U.S. Application Data

(60) Provisional application No. 62/067,441, filed on Oct. 23, 2014.

(51) Int. Cl.
*H04W 4/00* (2009.01)
*H04W 40/32* (2009.01)
*H04W 40/10* (2009.01)

(52) U.S. Cl.
CPC ........... *H04W 40/32* (2013.01); *H04W 40/10* (2013.01)

(58) Field of Classification Search
CPC .............................. H04W 40/32; H04W 40/10
(Continued)

(56) References Cited

U.S. PATENT DOCUMENTS

2015/0003263 A1* 1/2015 Senarath ............... H04L 5/0051
370/252

FOREIGN PATENT DOCUMENTS

KR 20120100449 9/2012

OTHER PUBLICATIONS

Peng, et al., "Cluster-based Multicast Transmission for Device-to-Device (D2D) Communication", Sep. 2013, 7 pages.
(Continued)

*Primary Examiner* — Marcos Batista
(74) *Attorney, Agent, or Firm* — Lee, Hong, Degerman, Kang & Waimey

(57) ABSTRACT

A method for terminal clustering in a wireless communication system supporting D2D (Device-to-Device) communication and an apparatus supporting the method are disclosed. More specifically, a method for a user equipment (UE) to perform UE clustering in a wireless communication system supporting D2D communication comprises determining an initial preference value, determining an initial preference triplet by performing an AP (Affinity Propagation) method by increasing or decreasing the preference value, updating a preference triplet through a GSS (Golden Section Search) method based on the initial preference triplet, determining a
(Continued)

final preference value for minimizing energy consumption of the entire UEs from the updated preference triplet; and determining a head UE and member UEs belonging to the head UE by performing the AP method by using the final preference value.

9 Claims, 19 Drawing Sheets

(58) Field of Classification Search
USPC .......................................... 455/446; 370/338
See application file for complete search history.

(56) References Cited

OTHER PUBLICATIONS

Chunyan Cao, et al., "Admission policy based clustering scheme for D2D underlay communications", Sep. 2014, 8 pages.
Roberto Santana, et al., "Affinity Propagation Enhanced by Estimation of Distribution Algorithms", Jul. 2011, 10 pages.
Ru Gao, et al., "A power efficient cluster head selection algorithm based on Affinity Propagation in heterogeneous sensor networks", Sep. 2010, 7 pages.
PCT International Application No. PCT/KR2015/011277, Written Opinion of the International Searching Authority dated Mar. 31, 2016, 8 pages.

* cited by examiner

[FIG. 1]
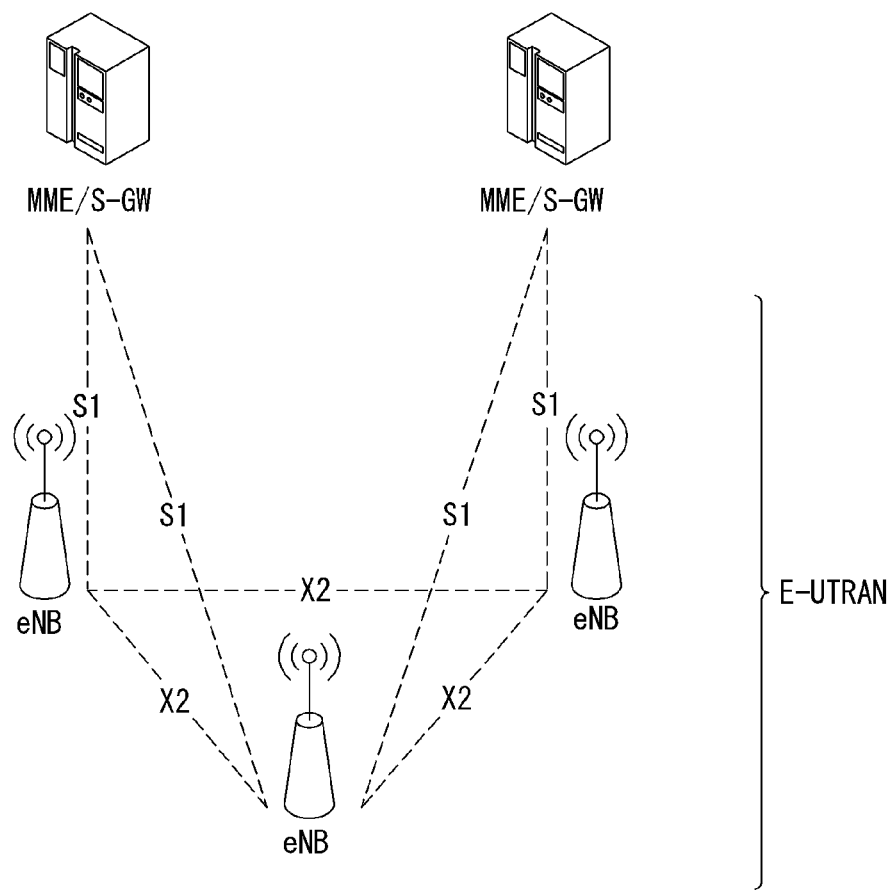

[FIG. 2]
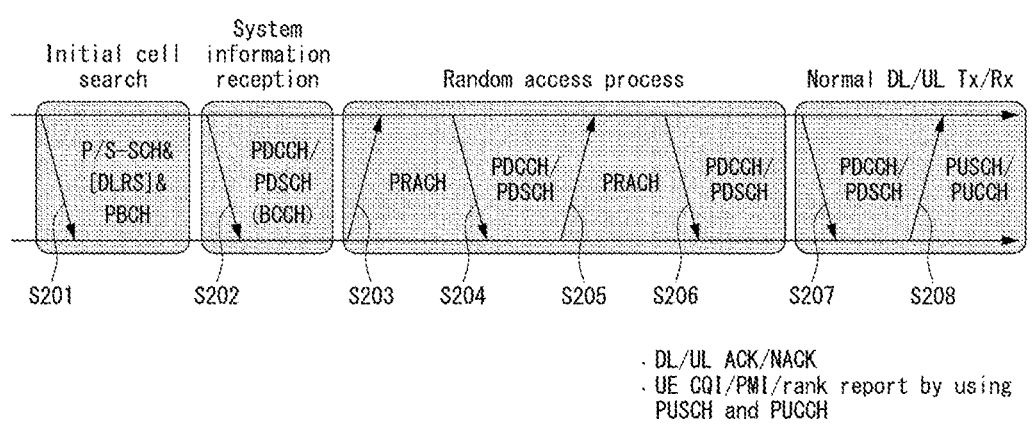

【FIG. 3】
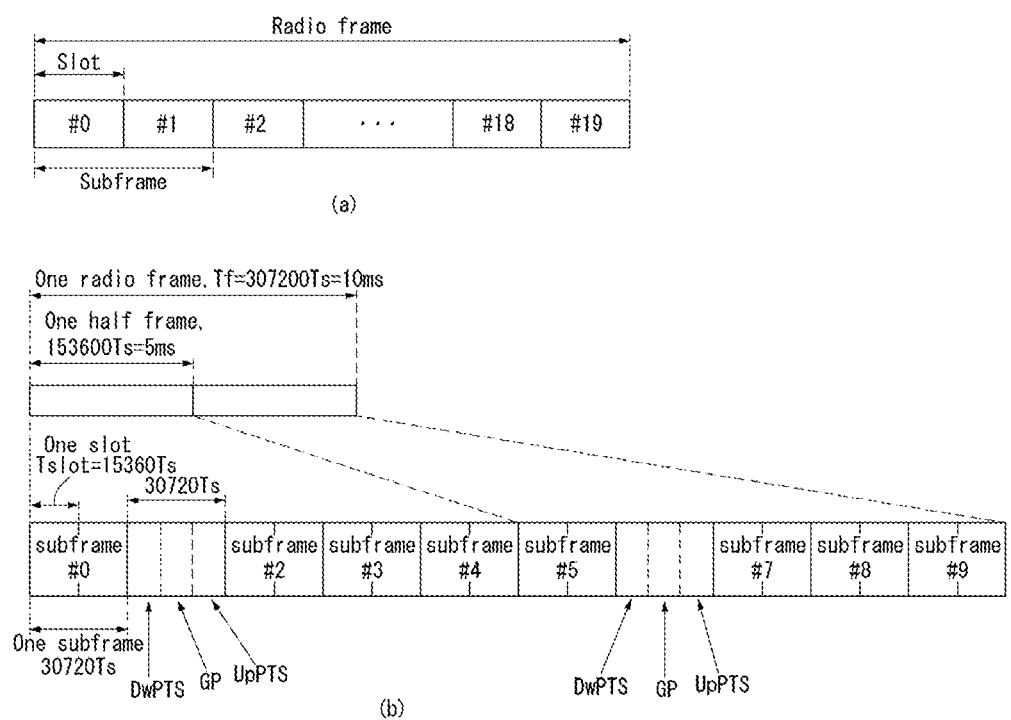

[FIG. 4]
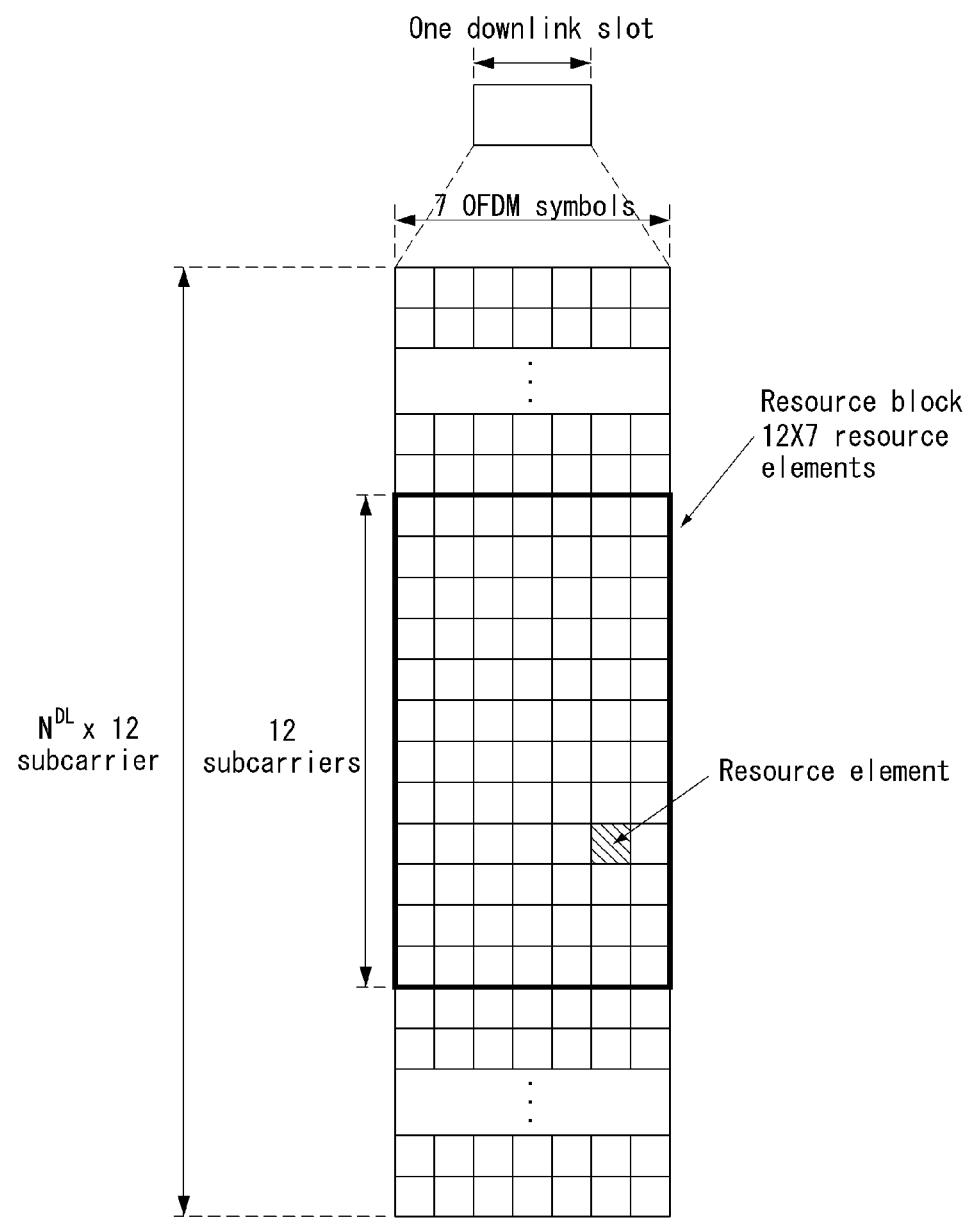

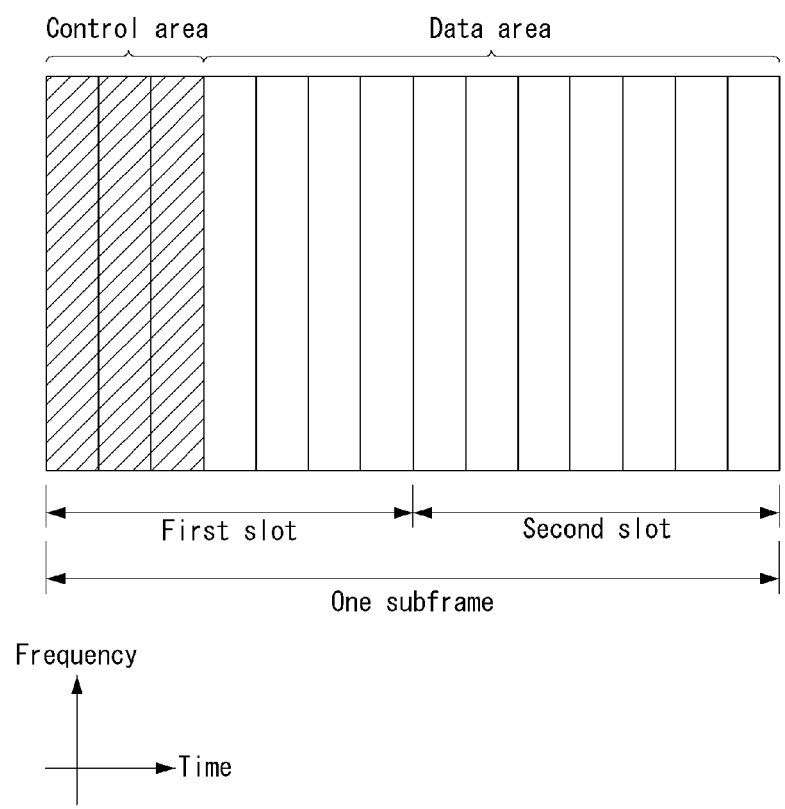
[FIG. 5]

【FIG. 6】
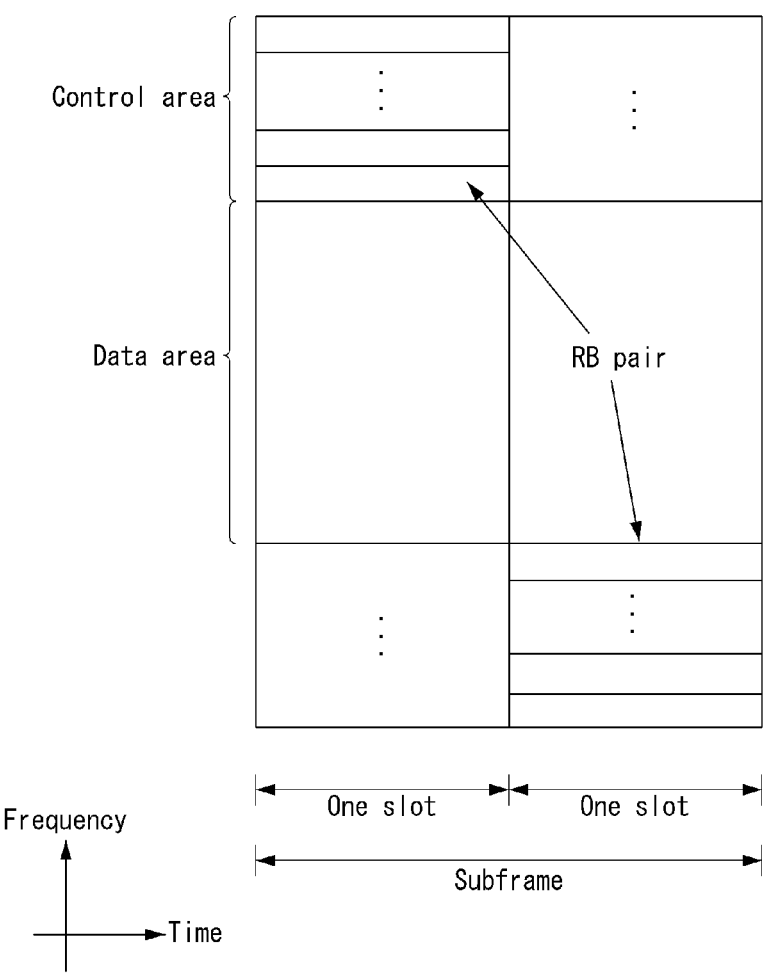

【FIG. 7】
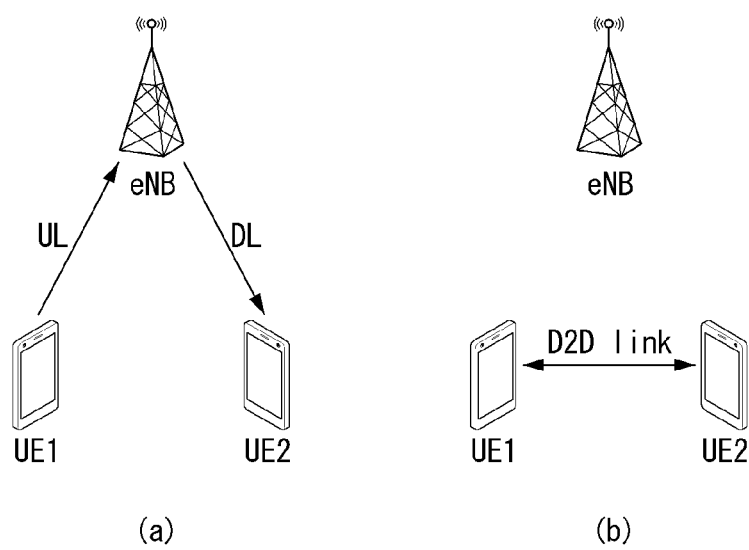

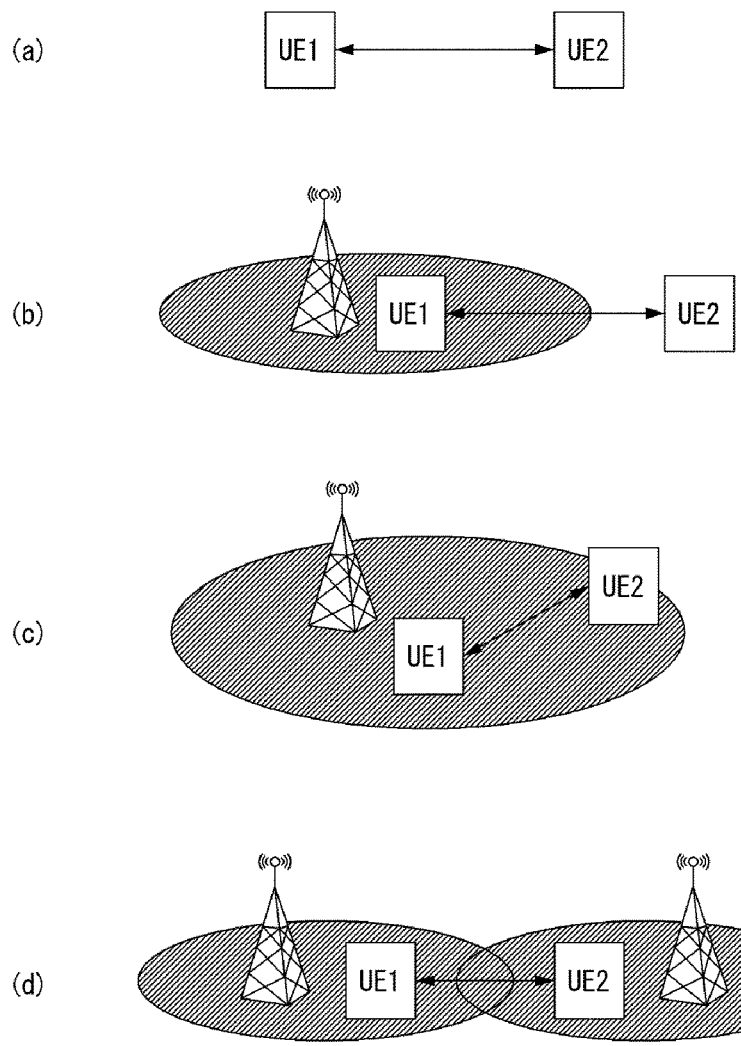

[FIG. 9]
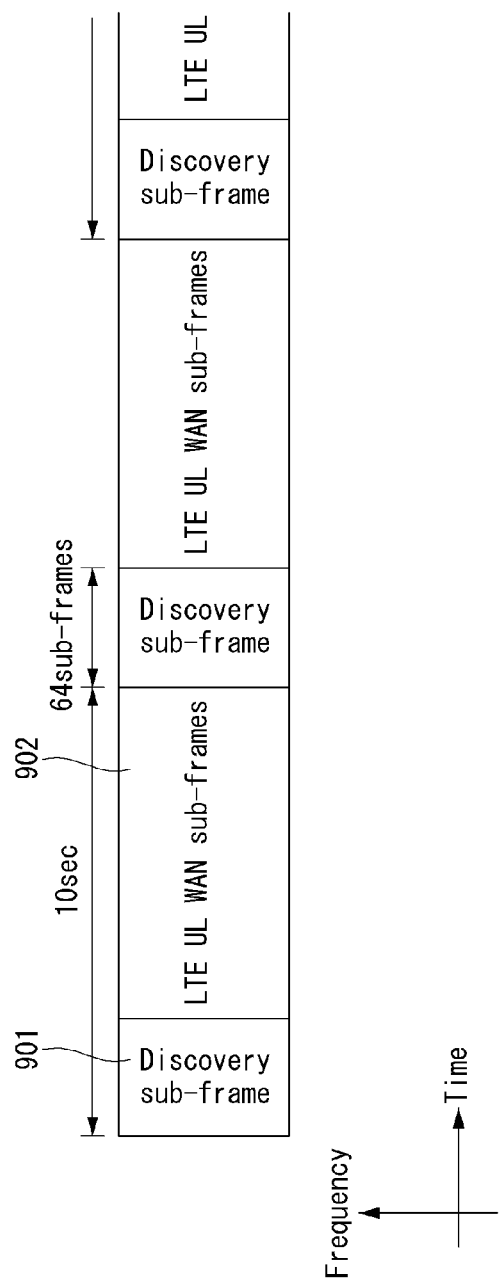

[FIG. 10]
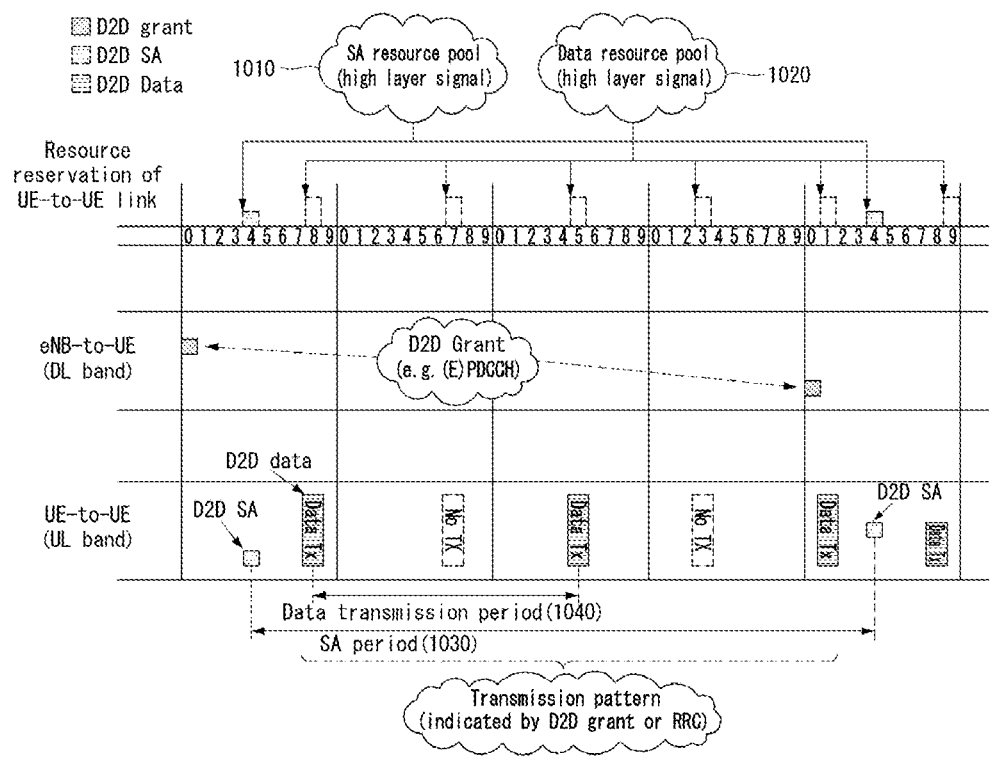

[FIG. 11]
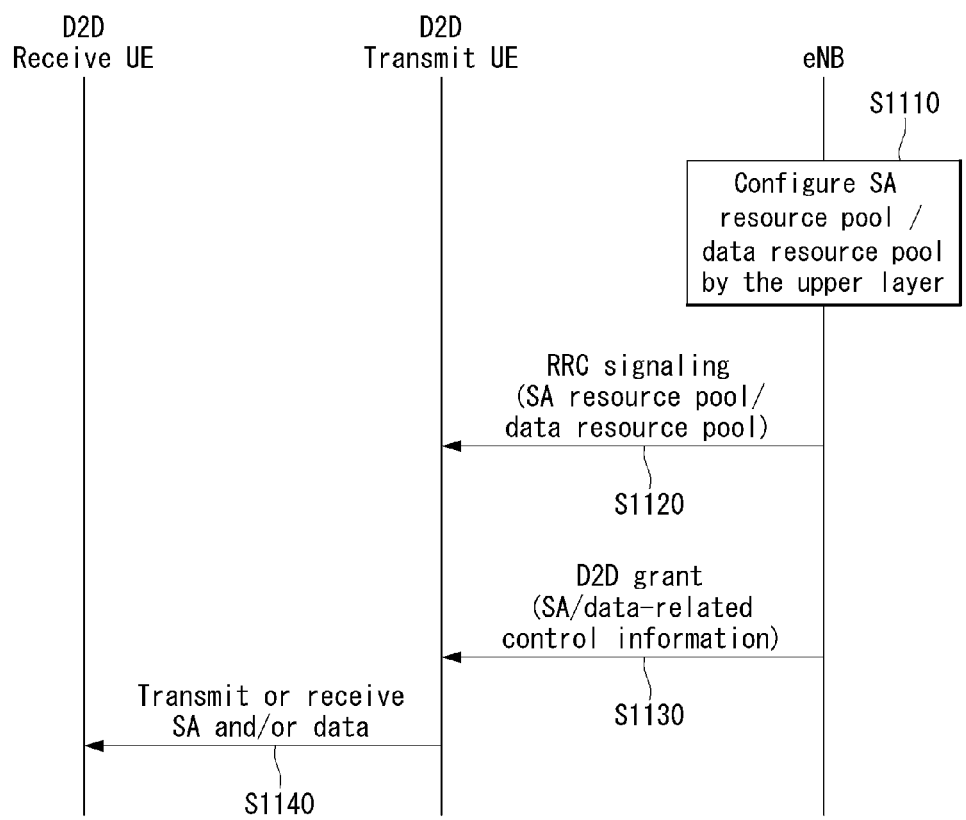

[FIG. 12]
 : Head node
 : Leaf node
— : Intra-cluster link
— : Inter-cluster link
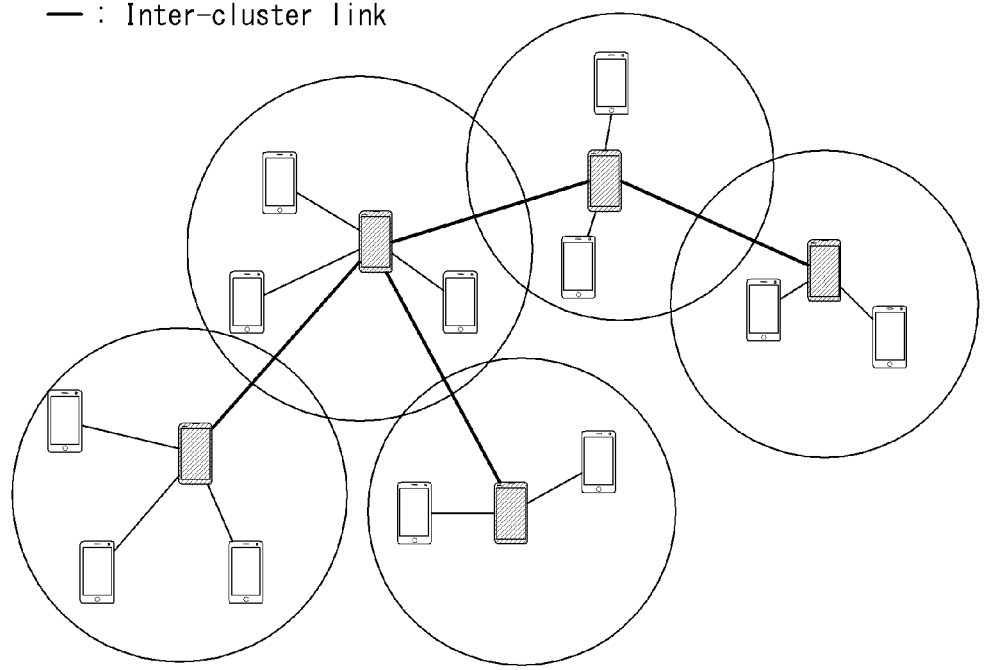

[FIG. 13]

Algorithm 1 Proposed clustering algorithm

1: Initialization: $p^{(1)} = \hat{p}(K_0)$, $p^{(2)} = \hat{p}(K_0 + \Delta K)$, $\emptyset_c = \emptyset = p_r = 0, l = 2$
2: $E(p^{(1)}) \leftarrow AP(p^{(1)})$, $E(p^{(2)}) \leftarrow AP(p^{(2)}), w = sign(E(p^{(1)}) - E(p^{(2)}))$
3: while $\emptyset_c = 0$ do
4:     $l = l + 1$
5:     $p^{(1)} = \hat{p}(K_0 + w(l - (1 + (1-w)/2))\Delta K)$
6:     $E(p^{(1)}) \leftarrow AP(p^{(1)})$
7:     if $E(p^{(l-1)}) < E(p^{(l)})$ then
8:         $(\emptyset_{min}, \emptyset_c, \emptyset_{max}) = (p^{(l-w-1)}, p^{(l-1)}, p^{(l+w-1)})$
9:     end if
10: end while
11: while $p_r = 0$ do
12:     $(\emptyset_{min}, \emptyset_c, \emptyset, \emptyset_{max}) \leftarrow GSS(\emptyset_{min}, \emptyset_c, \emptyset, \emptyset_{max})$
13:     $E(\emptyset) \leftarrow AP(\emptyset)$
14:     if $|\emptyset_{max} - \emptyset_{min}| > \varepsilon(|\emptyset_c| + |\emptyset|)$ then
15:         if $E(\emptyset) > E(\emptyset_c)$ then $p_r = \emptyset_c$
16:         else $p_r = \emptyset$
17:     end if
18: end if
19: end while
20: return $(V, N_j \text{'s}) \leftarrow AP(P_r)$

[FIG. 14]
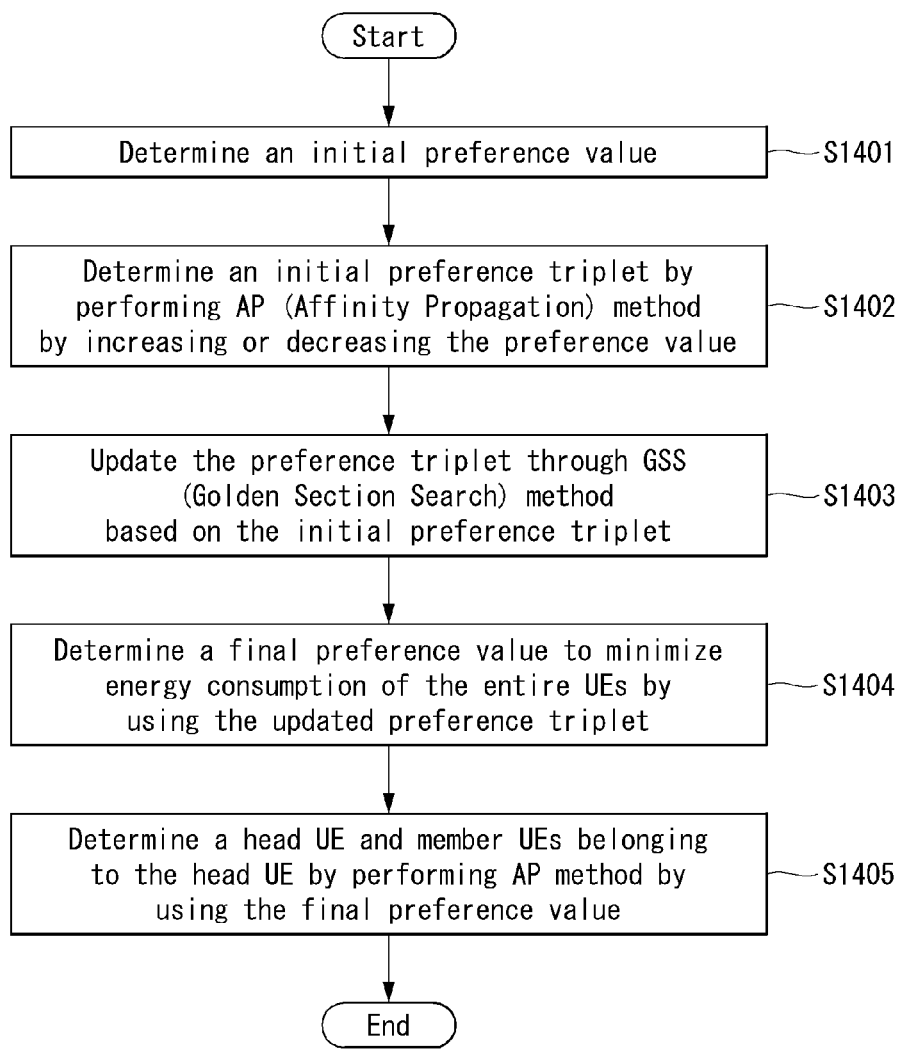

[FIG. 15]
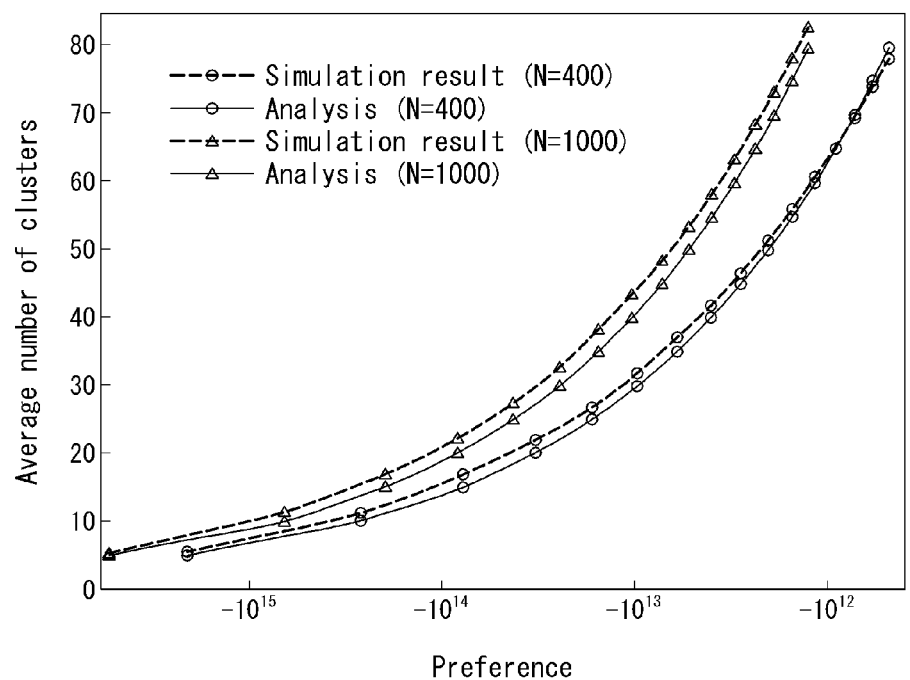

[FIG. 16]
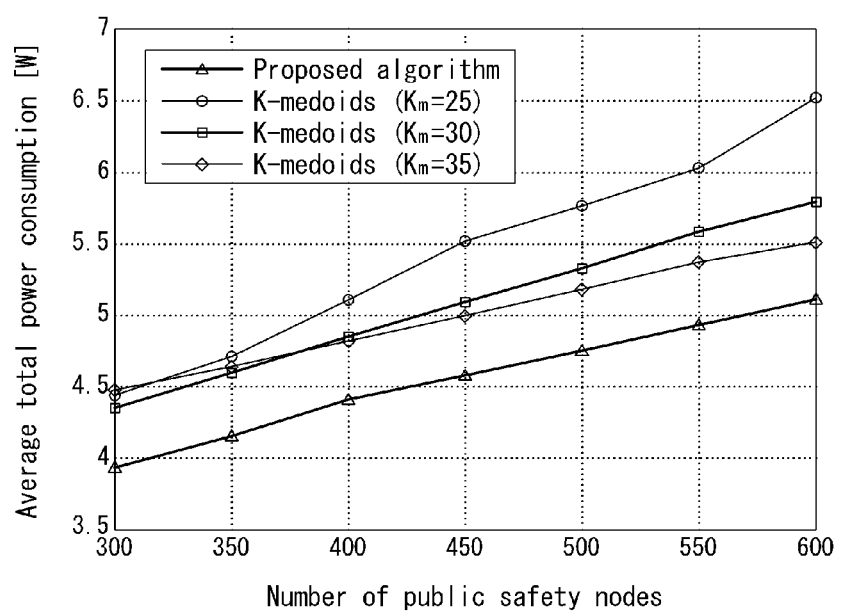

【FIG. 17】
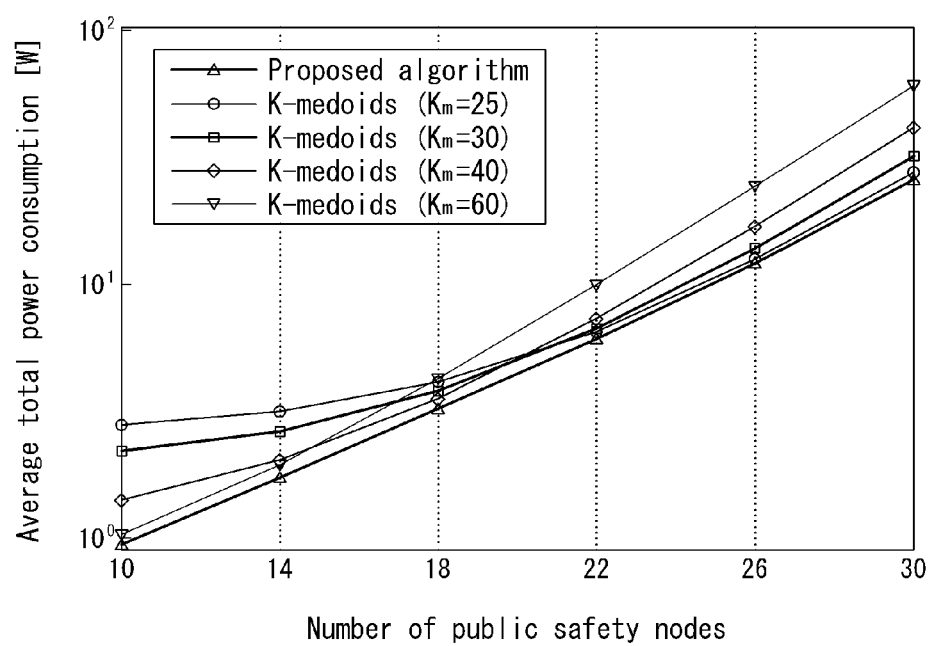

[FIG. 18]
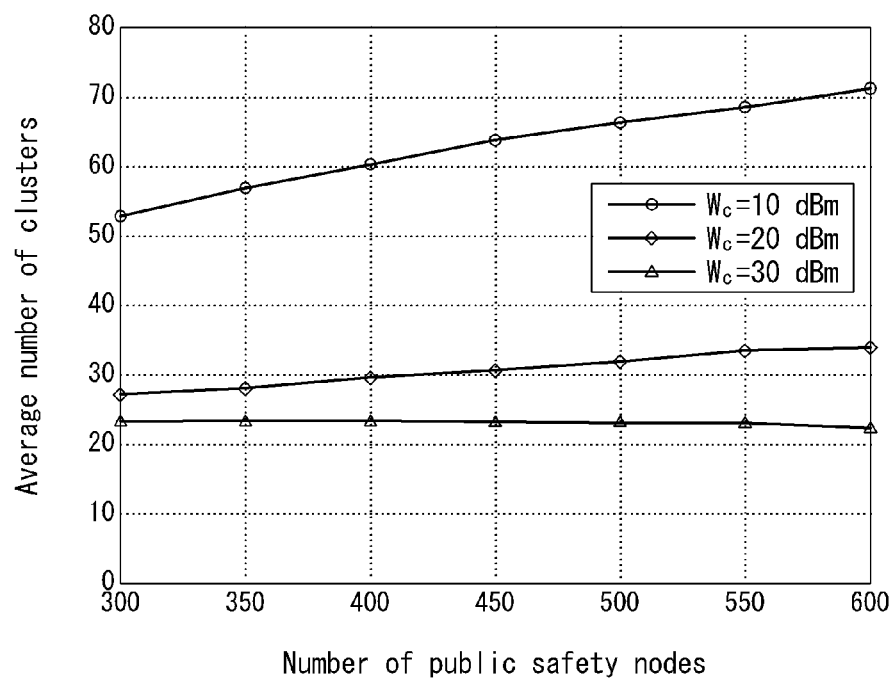

[FIG. 19]
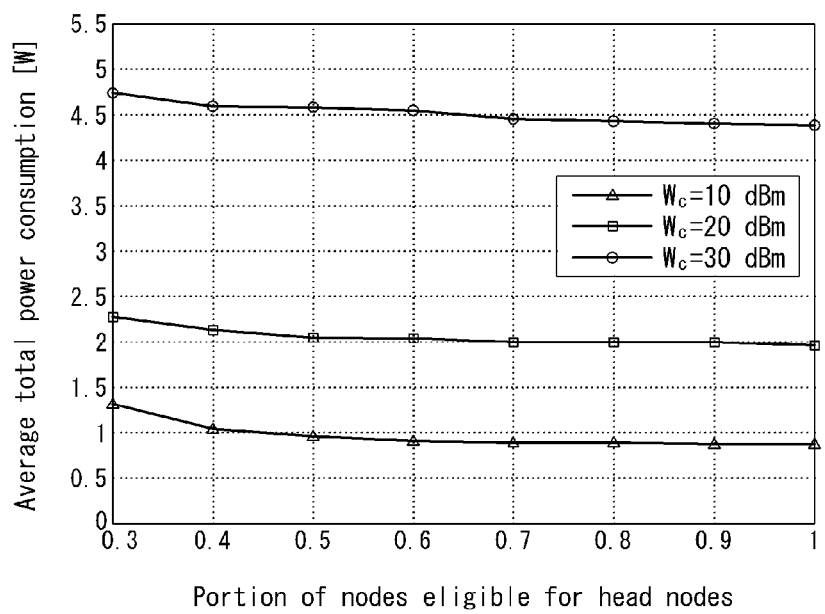
[FIG. 20]
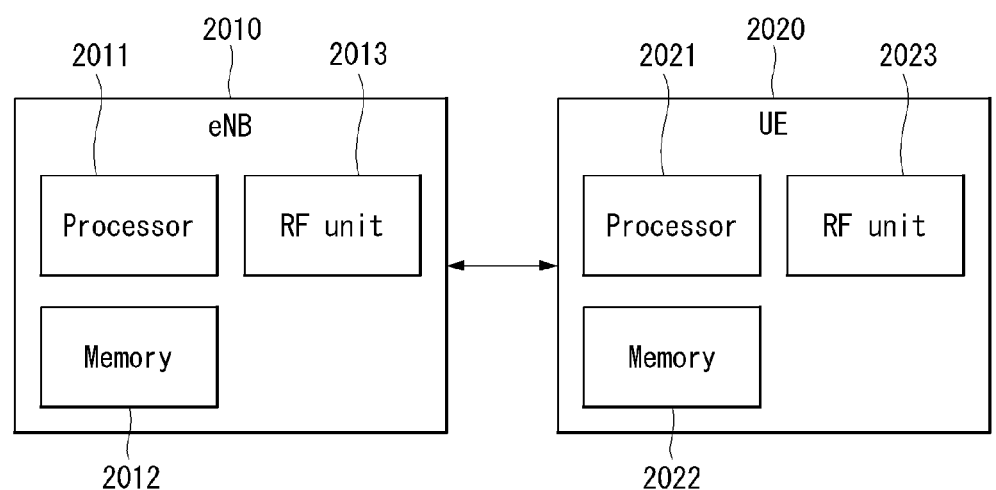

METHOD FOR TERMINAL CLUSTERING IN WIRELESS COMMUNICATION SYSTEM SUPPORTING DEVICE-TO-DEVICE COMMUNICATION AND APPARATUS THEREFOR

CROSS-REFERENCE TO RELATED APPLICATIONS

This application is the National Stage filing under 35 U.S.C. 371 of International Application No. PCT/KR2015/011277, filed on Oct. 23, 2015, which claims the benefit of U.S. Provisional Application No. 62/067,441, filed on Oct. 23, 2014, the contents of which are all hereby incorporated by reference herein in its entirety.

TECHNICAL FIELD

The present invention relates to a wireless communication system and more particularly, a method for user equipment (UE) clustering in a wireless communication system supporting device-to-device (D2D) communication and an apparatus supporting the method.

BACKGROUND ART

A mobile communication system has been developed to provide a voice service while guaranteeing activity of a user. However, the mobile communication system extends an area up to a data service as well as a voice and at present, a short phenomenon of a resource is caused due to an explosive increase of traffic and uses require a higher-speed service, and as a result, a more developed mobile communication system is required.

Requirements of a next-generation mobile communication system largely need to support accommodation of explosive data traffic, an epochal increase of transmission rate per user, accommodation of the significantly increased number of connection devices, very low end-to-end latency, and high energy efficiency. To this end, various technologies have been researched, which include dual connectivity, massive multiple input multiple output (MIMO), in-band full duplex, non-orthogonal multiple access (NOMA), super wideband supporting, device networking, and the like.

DISCLOSURE

Technical Problem

An object of the present invention is to provide a method for performing or supporting terminal clustering in a wireless communication system supporting D2D communication.

An object of the present invention is to provide a method for terminal clustering to construct a disaster communication network showing high energy efficiency and ensuring a reliable link.

Technical objects of the present invention are not limited to the above-described object and other technical objects that have not been described above will become evident to those skilled in the art from the following description.

Technical Solution

According to one aspect of the present invention, a method for a User Equipment (UE) to perform UE clustering in a wireless communication system supporting D2D (Device-to-Device) communication comprises determining an initial preference value, determining an initial preference triplet by performing an AP (Affinity Propagation) method by increasing or decreasing the preference value, updating a preference triplet through a GSS (Golden Section Search) method based on the initial preference triplet, determining a final preference value for minimizing energy consumption of the entire UEs from the updated preference triplet, and determining a head UE and member UEs belonging to the head UE by performing the AP method by using the final preference value.

According to another aspect of the present invention, a UE performing UE clustering in a wireless communication system supporting D2D communication comprises an RF (Radio Frequency) unit transmitting and receiving a wireless signal and a processor controlling the RF unit, wherein the processor is configured to determine an initial preference value, to determine an initial preference triplet by performing an AP (Affinity Propagation) method by increasing or decreasing the preference value, to update a preference triplet through a GSS (Golden Section Search) method based on the initial preference triplet, to determine a final preference value for minimizing energy consumption of the entire UEs from the updated preference triplet, and to determine a head UE and member UEs belonging to the head UE by performing the AP method by using the final preference value.

Preferably, whether to increase or decrease the preference value may be determined by comparing energy consumption of the entire UEs according to the initial preference value with energy consumption of the entire UEs according to a value obtained by adding an amount of change to the initial preference value.

Preferably, the initial preference triplet may be determined if an increased or decreased current preference value is larger than a previous preference value.

Preferably, a preference value may be derived through the GSS method based on the initial preference triplet, and the preference triplet may be updated based on a result of performing the AP method using a preference value derived through the GSS method and the initial preference triplet.

Preferably, the final preference value may be determined if a difference between the maximum and the minimum preference values of the updated preference triplet is smaller than a value obtained by applying a predetermined termination threshold to the difference between a middle preference value of the updated preference triplet and the preference value derived through the GSS method.

Preferably, energy consumption of the entire UEs may be the sum of the energy consumed in a head UE and the energy consumed for communication between the head UE and member UEs belonging to the head UE.

Preferably, the initial preference value may be determined by the value for generating the number of initial clusters determined in advance by the AP method.

Preferably, the number of initial clusters may be determined by a size of total area, a maximum distance between a head UE and member UEs within a cluster, and a maximum distance between head UEs.

Advantageous Effects

According to an embodiment of the present invention, UEs may be clustered efficiently in a wireless communication system supporting D2D communication.

Also, according to an embodiment of the present invention, a disaster communication network showing high energy efficiency and ensuring a reliable link may be constructed.

The technical effects of the present invention are not limited to the above-described effects and other technical effects that have not been described above will be evidently understood by those skilled in the art from the following description.

BRIEF DESCRIPTION OF THE DRAWINGS

The accompanying drawings, which are included herein as a part of a description in order to help understanding of the present invention, provide embodiments of the present invention, and describe the technical features of the present invention with the description below.

FIG. 1 illustrates an example of the network structure of E-UTRAN (evolved universal terrestrial radio access network) to which the present invention may be applied.

FIG. 2 illustrates physical channels and a view showing physical channels used for in the 3GPP LTE/LTE-A system to which the present invention can be applied.

FIG. 3 illustrates the structure of a radio frame in a wireless communication system to which an embodiment of the present invention can be applied.

FIG. 4 is a diagram illustrating a resource grid for one downlink slot in a wireless communication system to which an embodiment of the present invention can be applied.

FIG. 5 illustrates the structure of a downlink subframe in a wireless communication system to which an embodiment of the present invention can be applied.

FIG. 6 illustrates the structure of an uplink subframe in a wireless communication system to which an embodiment of the present invention can be applied.

FIG. 7 is a diagram for conceptually describing D2D communication in the wireless communication system to which the present invention can be applied.

FIG. 8 illustrates one example of various scenarios of D2D communication to which a method proposed by the present specification can be applied.

FIG. 9 is a diagram for describing a distributed discovery resource allocating method in the wireless communication system to which the present invention can be applied.

FIG. 10 is a diagram for describing a method for transmitting/receiving signaling for D2D direct communication in the wireless communication system to which the present invention can be applied.

FIG. 11 is a diagram for describing a method for transmitting downlink control information for D2D direct communication in the wireless communication system to which the present invention can be applied.

FIG. 12 illustrates a communication network comprising head nodes and leaf nodes according to one embodiment of the present invention.

FIG. 13 illustrates a UE clustering algorithm according to one embodiment of the present invention.

FIG. 14 illustrates a UE clustering method according to one embodiment of the present invention.

FIGS. 15 to 19 illustrate a simulation result of a terminal clustering method according to the present invention.

FIG. 20 illustrates a block diagram of a wireless communication apparatus according to one embodiment of the present invention.

MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the terminal may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical spirit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

Hereinafter, in order to clearly describe the present invention, 3GPP LTE/LTE-A is primarily described, but a technical feature of the present invention is not limited thereto.

General system

FIG. 1 illustrates an example of the network structure of E-UTRAN (evolved universal terrestrial radio access network) to which the present invention may be applied.

An E-UTRAN system is an advanced version of the existing UTRAN system, and may be a 3GPP LTE/LTE-A system, for example. E-UTRAN consists of eNBs that provide a control plane protocol and a user plane protocol to UEs, and the eNBs are connected via the X2 interface. The X2 user plane interface X2-U is defined between the eNBs. The X2-U interface provides non-guaranteed delivery of user plane PDUs (packet data units). The X2 control plane interface X2-CP is defined between two neighbor eNBs. The X2-CP performs the following functions: context transfer between eNBs, control of user plane tunnels between a source eNB and a target eNB, transfer of handover-related messages, uplink load management and the like. An eNB is connected to user equipment UE through a radio interface and is connected to an Evolved Packet Core (EPC) through the S1 interface. The S1 user plane interface (SI-U) is defined between the eNB and the serving gateway (S-GW). The SI control plane interface (SI-MME) is defined between the eNB and the MME (Mobility Management Entity). The S1 interface performs the following functions: EPS (Enhanced Packet System) Bearer Service Management function, NAS (Non-Access Stratum) Signaling Transport function, Network Sharing Function, MME Load balancing Function and the like. The S1 interface supports many-to-many relations between eNBs and MMEs/S-GWs.

FIG. 2 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S201. For the initial cell search operation, the UE may receive a Primary Synchronization Channel (P-SCH) (or Primary Synchronization Signal (PSS)) and a Secondary Synchronization Channel (S-SCH) (or Secondary Synchronization Signal (SSS)) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S202.

Thereafter, the UE may perform a random access procedure in steps S203 to S206, in order to complete the access to the BS. For the random access procedure, the UE may transmit a preamble via a Physical Random Access Channel (PRACH) (S203), and may receive a message in response to the preamble via the PDCCH and the PDSCH corresponding thereto (S204). In contention-based random access, a contention resolution procedure including the transmission of an additional PRACH (S205) and the reception of the PDCCH and the PDSCH corresponding thereto (S206) may be performed.

The UE which performs the above-described procedure may then receive the PDCCH/PDSCH (S207) and transmit a Physical Uplink Shared Channel (PUSCH)/Physical Uplink Control Channel (PUCCH) (S208), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), precoding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 3 illustrates the structure of a radio frame in a wireless communication system to which an embodiment of the present invention can be applied.

3GPP LTE/LTE-A support a radio frame structure type 1 which may be applicable to Frequency Division Duplex (FDD) and a radio frame structure which may be applicable to Time Division Duplex (TDD).

FIG. 3(*a*) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 3(*b*) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

The structure of a radio frame is only one example. The number of subcarriers included in a radio frame or the number of slots included in a subframe and the number of OFDM symbols included in a slot may be changed in various ways.

FIG. 4 is a diagram illustrating a resource grid for one downlink slot in a wireless communication system to which an embodiment of the present invention can be applied.

Referring to FIG. 4, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

FIG. 5 illustrates the structure of a downlink subframe in a wireless communication system to which an embodiment of the present invention can be applied.

Referring to FIG. 5, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a high layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 6 illustrates the structure of an uplink subframe in a wireless communication system to which an embodiment of the present invention can be applied.

Referring to FIG. 6, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Device-to-Device (D2D) Communication

A Device-to-Device (D2D) communication technology means a scheme in which terminals which are geographically proximate to each other directly communicate with each other without using an infrastructure such as the base station. As the D2D communication technology, technologies primarily using an unlicensed frequency band have been developed, such as Wi-Fi Direct and Bluetooth. However, development and standardization of the D2D communication technology using a licensed frequency band are in progress for the purpose of improving frequency use efficiency of a cellular system.

In general, the D2D communication as a term which denotes communication between things or the M2M communication is limitedly used, but the D2D communication in the present invention may include all of communication among various types of devices having a communication function, such as a smart phone or a personal computer in addition to a simple device having the communication function.

FIG. 7 is a diagram for conceptually describing D2D communication in the wireless communication system to which the present invention can be applied.

FIG. 7(a) illustrates a base station based communication scheme in the related art and terminal 1 (UE 1) may transmit data to the base station on the uplink and the base station may transmit data to terminal 2 (UE 2) on the downlink. The communication scheme may be referred to as an indirect communication scheme through the base station. In the indirect communication scheme, a Un link (as a link between the base stations or a link between the base station and a repeater, may be referred to as a backhaul link) which is a link defined in a wireless communication system in the related art and/or a Un link (as a link between the base station and the terminal or a link between the repeater and the terminal, may be referred to as an access link) may be associated.

FIG. 7(b) as one example of the D2D communication illustrates a UE-to-UE communication scheme and UE-to- UE data exchange may be performed without using the base station. The communication scheme may be referred to as a direct communication scheme between the devices. The D2D direct communication scheme has advantages including a decrease in latency, use of less radio resources, and the like as compared with the indirect communication scheme through the base station.

FIG. 8 illustrates one example of various scenarios of D2D communication to which a method proposed by the present specification can be applied.

A scenario of the D2D communication may be largely divided into (1) an Out-of-coverage network, (2) a partial-coverage network, and (3) an in-coverage network according to whether UE 1 and UE 2 are positioned in coverage/out of coverage.

The case of the in-coverage network may be divided into an in-coverage-single-cell and an in-coverage-multi-cell according to the number of cells corresponding to the coverage of the base station.

FIG. 8(a) illustrates one example of an Out-of-coverage network scenario of the D2D communication.

An out-of-coverage network scenario represents D2D communication between D2D terminals without control of the base station.

In FIG. 8(a), it may be illustrated that only UE 1 and UE 2 are present and UE 1 and UE 2 perform direct communication.

FIG. 8(b) illustrates one example of a partial-coverage network scenario of the D2D communication.

The partial-coverage network scenario represents performing the D2D communication between the D2D terminal positioned in the network coverage and the D2D terminal positioned out of the network coverage.

In FIG. 8(b), it may be illustrated that UE 1 positioned in the network coverage and UE 2 positioned out of the network coverage communicate with each other.

FIG. 8(c) illustrates one example of an in-coverage-single-cell scenario and FIG. 8(d) illustrates one example of an in-coverage-multi-cell scenario.

The in-coverage network scenario represents that the D2D terminals perform the D2D communication through the control of the base station in the network coverage.

In FIG. 8(c), UE 1 and UE 2 are positioned within the same network coverage (alternatively, cell) and perform the D2D communication under the control of the base station.

In FIG. 8(d), UE 1 and UE 2 are positioned in the network coverage, but positioned in different network coverage. In addition, UE 1 and UE 2 perform the D2D communication under the control of the base station managing each network coverage.

Hereinafter, the D2D communication will be described in more detail.

The D2D communication may operate in the scenario illustrated in FIG. 8, but in general, the D2D communication may operate in the coverage and out of the coverage. A link used for the D2D communication (UE-to-UE direct communication) may be referred to as D2D link, direct link, or sidelink, but hereinafter, the link used for the D2D communication will be collectively called and described as the sidelink for easy description.

Sidelink transmission may operate in an uplink spectrum in the case of FDD and operate in an uplink (alternatively, downlink) subframe in the case of TDD. Time division multiplexing (TDM) may be used for multiplexing the sidelink transmission and uplink transmission.

The sidelink transmission and the uplink transmissions do not simultaneously occur. The sidelink subframe partially or totally overlapped with the uplink subframe or UpPTS used for the uplink transmission, the sidelink transmission does not occur. Further, sidelink transmission and reception do not also simultaneously occur.

In the case of a structure of a physical resource used for the sidelink transmission, a structure of an uplink physical resource may be similarly used. However, a last symbol of the sidelink subframe is constituted by a guard period not to be used for the sidelink transmission.

The sidelink subframe may be configured by an extended CP or a normal CP.

The D2D communication may be largely divided into discovery, direct communication, and synchronization.

1) Discovery

The D2D discovery may be applied in the network coverage (including Inter-cell and Intra-cell). In inter-cell discovery, both synchronous and asynchronous cell deployments may be considered. The D2D discovery may be used for various commercial purposes including advertisement, coupon issue, friend finding, and the like for a terminal within a proximate area.

When UE 1 plays a role of transmitting a discovery message, UE 1 transmits the discovery message and UE 2 receives the discovery message. Transmission and reception roles of UE 1 and UE 2 may be exchanged with each other. The discovery message transmitted from UE 1 may be received by one or more UE(s) such as UE 2.

The discovery message may include a single MAC PDU and herein, the single MAC PDU may include a UE identifier (ID) and an application ID.

As a channel for transmitting the discovery message, a physical sidelink discovery channel (PDSCH) may be defined. As a structure of the PDSCH, a PUSCH structure may be reused.

As a resource allocation method for the D2D discovery, two types (Type 1 and Type 2) may be used.

In the case of Type 1, the base station may allocate a resource for transmitting the discovery message by a non-UE specific scheme.

In detail, a radio resource pool for discovery transmission and reception constituted by a plurality of subframe sets and a plurality of resource block sets is allocated within a specific period (hereinafter, referred to as 'discovery period') and discovery transmission UE arbitrarily selects a specific resource in the radio resource pool and thereafter, transmits the discovery message.

The periodic discovery resource pool may be allocated for transmitting a discovery signal by a semi-static scheme. Configuration information of the discovery resource pool for the discovery transmission includes the discovery period, subframe set and resource block set information which may be used for transmitting the discovery signal within the discovery period, and the like. The configuration information of the discovery resource pool may be transmitted to the UE by high layer signaling. In the case of in-coverage UE, the discovery resource pool for the discovery transmission may be configured by the base station and notified to the UE by using RRC signaling (e.g., a system information block (SIB)).

The discovery resource pool allocated for the discovery within one discovery period as a time-frequency resource block having the same size may be multiplexed by TDM and/or FDM and the time-frequency resource block having the same size may be referred to as 'discovery resource'. The discovery resource may be divided by the unit of one subframe and include two physical resource blocks (PRBs)

per slot in each subframe. One discovery resource may be used for transmitting a discovery MAC PDU by one UE.

Further, the UE may repeatedly transmit the discovery signal within the discovery period for transmitting one transport block. The MAC PDU transmitted by one UE may be repeatedly (e.g., repeatedly four times) contiguously or non-contiguously within the discovery period (that is, the radio resource pool). The number of transmission times of the discovery signal for one transport block may be transmitted to the UE by the high layer signaling.

The UE may arbitrarily select a first discovery resource in a discovery resource set which may be used for repeated transmission of the MAC PDU and other discovery resources may be determined in association with the first discovery resource. For example, a predetermined pattern may be previously set and the next discovery resource may be determined according to the previously set pattern according to a position of the discovery resource which the UE first selects. Or, the UE may arbitrarily select each discovery resource in the discovery resource set which may be used for the repeated transmission of the MAC PDU.

In Type 2, the resource for transmitting the discover message is UE-specifically allocated. Type 2 is subdivided into Type 2A (Type-2A) and Type 2B (Type-2B). Type 2A is a scheme in which the base station allocates the resource every transmission instance of the discovery message within the discovery period and Type 2B is a scheme in which the base station allocates the resource by a semi-persistent scheme.

In the case of Type 2B, RRC_CONNECTED UE requests allocation of the resource for transmitting the D2D discovery message to the base station through the RRC signaling. In addition, the base station may allocate the resource through the RRC signaling. When the UE is transitioned to the RRC_IDLE state or when the base station withdraws the resource allocation through the RRC signaling, the UE release a transmission resource which is allocated most recently. As described above, in the case of Type 2B, the radio resource may be allocated by the RRC signaling and activation/deactivation of the radio resource allocated by the PDCCH may be determined.

The radio resource pool for receiving the discovery message may be configured by the base station and notified to the UE by using the RRC signaling (e.g., the system information block (SIB)).

The UE that receives the discovery message monitors both the discovery resource pools of Type 1 and Type 2 in order to receive the discovery message.

2) Direct Communication

An application area of the D2D direct communication includes even a network coverage edge-of-coverage area as well as network in-coverage and out-of-coverage areas. The D2D direct communication may be used for a purpose such as public safety, or the like.

When UE 1 plays a role of transmitting direct communication data, UE 1 transmits the direct communication data and UE 2 receives the direct communication data. Transmission and reception roles of UE 1 and UE 2 may be exchanged with each other. The direct communication transmission from UE 1 may be received by one or more UE(s) such as UE 2.

The D2D discovery and the D2D communication may not be associated with each other but independently defined. That is, in groupcast and broadcast direct communication, the D2D discovery is not required. As such, when the D2D discovery and the D2D direct communication are independently defined, the UEs need not recognize adjacent UE. In other words, in the case of the groupcast and broadcast direct communication, all receiving UEs in a group are not required to be proximate to each other.

As a channel for transmitting the D2D direct communication data, a physical sidelink shared channel (PSSCH) may be defined. Further, as a channel for transmitting control information (e.g., scheduling assignment (SA), a transmission format, and the like for transmitting the direct communication data) for the D2D direct communication, a physical sidelink control channel (PSCCH) may be defined. As the structures of the PSSCH and the PSCCH, the PUSCH structure may be reused.

As a resource allocation method for the D2D direct communication, two modes (mode 1 and mode 2) may be used.

Mode 1 represents a scheme in which the base station schedules a resource used for transmitting data or control information for the D2D direct communication to the UE. In the in-coverage, mode 1 is applied.

The base station configures the resource pool required for the D2D direct communication. Herein, the resource pool required for the D2D communication may be divided into a control information pool and a D2D data pool. When the base station schedules control information and D2D data transmission resources within a pool configured for transmitting D2D UE by using the PDCCH or ePDCCH, the transmitting D2D UE transmits control information and D2D data by using an allocated resource.

The transmitting UE requests a transmission resource to the base station and the base station schedules resources for transmitting the control information and the D2D direct communication data. That is, in the case of mode 1, the transmitting UE needs to be in the RRC_CONNECTED state in order to perform the D2D direct communication. The transmitting UE transmits the scheduling request to the base station and thereafter, the buffer status report (BSR) procedure is performed so that the base station determines the quantity of resources requested by the transmitting UE.

When receiving UEs monitor the control information pool and decodes control information associated therewith, the receiving UEs may selectively decode D2D data transmission associated with the corresponding control information. The receiving UE may not decode the D2D data pool according to a control information decoding result.

Mode 2 represents a scheme in which the UE arbitrarily selects a specific resource in the resource pool in order to transmit data or control information for the D2D direct communication. In the out-of-coverage and/or edge-of-coverage, mode 2 is applied.

In mode 2, the resource pool for transmitting the control information and/or the resource pool for transmitting the D2D direct communication data may be pre-configured or semi-statically configured. The UE receives the configured resource pool (a time and a frequency) and selects the resource for the D2D communication transmission. That is, the UE may select the resource for transmitting the control information in the control information resource pool in order to transmit the control information. Further, the UE may select the resource in the data resource pool in order to transmit the D2D direct communication data.

In D2D broadcast communication, the control information is transmitted by a broadcasting UE. The control information indicates explicitly and/or implicitly a position of a resource for data reception in association with the physical channel (that is, PSSCH) transporting the D2D direct communication data.

3) Synchronization

A D2D synchronization signal/sequence (D2DSS) may be used for the UE to acquire time-frequency synchronization. In particular, since the control of the base station is impossible out of the network coverage, a new signal and a new procedure for establishing UE-to-UE synchronization may be defined. The D2D synchronization signal/sequence (D2DSS) may be referred to as a sidelink synchronization signal.

A UE that periodically transmits the D2D synchronization signal/sequence (D2DSS) may be referred to as a D2D synchronization source or a sidelink synchronization source. When the D2D synchronization source is the base station, a structure of the D2D synchronization signal/sequence (D2DSS) may be the same as the PSS/SSS. When the D2D synchronization source is not the base station (for example, the UE or a global navigation satellite system (GNSS)), the structure of the D2D synchronization signal/sequence (D2DSS) may be newly defined.

The D2D synchronization signal/sequence (D2DSS) is periodically transmitted with a period which is not smaller than 40 ms. Each UE may have multiple physical-layer D2D synchronization identities. The physical-layer D2D synchronization identity may be referred to as a physical-layer sidelink synchronization identity or just referred to as a D2D synchronization identity.

The D2D synchronization signal/sequence (D2DSS) includes a D2D primary synchronization signal/sequence and a D2D secondary synchronization signal/sequence. The D2D primary synchronization signal/sequence and the D2D secondary synchronization signal/sequence may be referred to as a primary sidelink synchronization signal (PSSS) and a secondary sidelink synchronization signal (SSSS), respectively.

Before transmitting the D2D synchronization signal/sequence (D2DSS), the UE may first search the D2D synchronization source. In addition, when the D2D synchronization source is searched, the UE may acquire the time-frequency synchronization through the D2D synchronization signal/sequence received from the searched D2D synchronization source. In addition, the corresponding UE may transmit the D2D synchronization signal/sequence.

Further, a channel may be required, which is used for purpose of transferring system information and synchronization-related information used for the UE-to-UE communication together with synchronization and the channel for the purpose may be defined. The channel may be referred to as a physical D2D synchronization channel (PD2DSCH) or a physical sidelink broadcast channel (PSBCH).

Hereinafter, direct communication between two devices in the D2D communication is described as an example for clarity, but the scope of the present invention is not limited thereto and the same principle described in the present invention may be applied even to D2D communication among two or more plural devices.

D2D Discovery

Hereinafter, in the present description, a signal (alternatively, message) which the UEs periodically transmit for the D2D discovery may be referred to as the discovery message, the discovery signal, a beacon, and the like. Hereinafter, the discovery message, the discovery signal, the beacon, and the like are collectively called the discovery message.

In distributed discovery, as a resource used for the UE to transmit and receive the discovery message, a dedicated resource may be periodically allocated apart from a cellular resource. The dedicated resource will be described below with reference to FIG. 9.

FIG. 9 is a diagram for describing a distributed discovery resource allocating method in the wireless communication system to which the present invention can be applied.

Referring to FIG. 9, in a distributed discovery scheme, a discovery subframe (that is, a 'discovery resource pool') 901 for discovery among all cellular uplink frequency-time resources is fixedly (alternatively, dedicatedly) allocated and the residual area is constituted by an LTE uplink wide area network (WAN) subframe area 902 in the related art. The discovery resource pool may be constituted by one or more subframes.

The discovery resource pool may be periodically allocated at a predetermined time interval (that is, a 'discovery period'). Further, the discovery resource pool may be repeatedly configured within one discovery period.

FIG. 9 illustrates an example in which the discovery resource pool is allocated with a discovery period of 10 sec and 64 consecutive subframes are allocated to the respective discovery resource pools. However, the size of the time/frequency resource of the discovery period and the discovery resource pool corresponds to one example and the present invention is not limited thereto.

The UE autonomously selects the resource (that is, the 'discovery resource') for transmitting the discovery message thereof in the dedicatedly allocated discovery pool and transmits the discovery message through the selected resource.

D2D Direct Communication

The D2D control information may be referred to as sidelink control information (SCI) or scheduling assignment (SA). As described above, the D2D control information may be transmitted on the PSCCH and the D2D data may be transmitted on the PSSCH. Hereinafter, the D2D control information will be referred to as SA.

FIG. 10 is a diagram for describing a method for transmitting/receiving signaling for D2D direct communication in the wireless communication system to which the present invention can be applied.

FIG. 10 illustrates a method that performs the D2D communication by transmitting/receiving a D2D operating procedure in a D2D operating procedure (D2D communication Mode 1) by the control of the base station and information associated therewith.

As illustrated in FIG. 10, a scheduling assignment (SA) resource pool 1010 and/or a data resource pool 1020 associated with the D2D communication may be pre-configured and the pre-configured resource pool may be transmitted from the base station to the D2D UEs through the high layer signaling.

The high layer signaling may be the RRC signaling.

An expression of 'A and/or B' used in the specification may be interpreted as a concept meaning at least one of A and B (indicating A, B, or A & B).

The SA resource pool and/or data resource pool means a resource reserved for the D2D (UE-to-UE) link or the D2D communication.

The UE-to-UE link may be expressed as sidelink.

In detail, the SA resource pool means a resource area to transmit the SA and the data resource pool means a resource area to transmit the D2D data.

The SA may be transmitted according to an SA period 1030 and the D2D data may be transmitted according to a data transmission period 1040.

The SA period and/or the data transmission period may be transmitted from the base station to the D2D UE through a D2D grant.

Alternatively, the SA period may be transmitted through the D2D grant and the data transmission period may be transmitted through the SA.

Herein, the D2D grant represents downlink control information (DCI) required for transmitting the SA and the D2D data transmitted to the D2D UE by the base station.

The D2D grant may be expressed as DCI format 5 and transmitted through the physical layer channels including the PDCCH, the EPDCCH, and the like or an MAC layer channel.

Further, the D2D grant may include information associated with SA transmission and information associated with data transmission.

The SA may include a resource allocation (RA), an MCS, a new data indicator (NDI), a redundancy version (RV), and the like as an example.

As described above, the SA resource pool for the SA transmission may be transmitted through the RRC signaling.

Further, the SA may be transmitted through the Physical Sidelink Control Channel (PSCCH) and the D2D data may be transmitted through the Physical Sidelink Shared Channel (PSSCH).

The D2D transmitting UE may receive SA information, in particular, resource allocation (RA) information (hereinafter, referred to as 'SA RA' information) in which the SA may be transmitted, from the base station through the D2D grant.

In this case, the D2D transmitting UE may transmit the SA RA information received from the base station to the D2D receiving UE as it is or generate new SA RA information by referring to the received SA RA information and thereafter, transmit the newly generated SA RA information to the D2D receiving UE.

Herein, when the D2D transmitting UE newly generates the SA RA, the D2D transmitting UE needs to perform resource allocation of the SA only within the resource pool indicated by a D2D grant RA.

That is, the D2D transmitting UE may transmit the SA by selecting only a partial resource area (SA RA) in the resource area (D2D grant RA) which eNB allows to be used.

Alternatively, contrary to this, the D2D transmitting UE may use the D2D grant RA allocated by the eNB as it is.

FIG. 11 is a diagram for describing a method for transmitting downlink control information for D2D direct communication in the wireless communication system to which the present invention can be applied.

First, the SA resource pool and/or D2D data resource pool associated with the D2D communication are/is configured by a high layer (S1110).

Thereafter, the base station transmits the SA resource pool and/or D2D data resource pool to the D2D UE through the high layer signaling (S1120).

Thereafter, the base station transmits control information associated with the SA and/or control information associated with the D2D data to the D2D transmitting UE through the D2D grant separately or together (S1130). The control information includes scheduling information of the SA and/or D2D data in the SA resource pool and/or D2D data resource pool. The control information may include the RA, the MCS, the NDI, the RV, and the like as one example.

Thereafter, the D2D transmitting UE transmits the SA and/or D2D data to the D2D receiving UE based on the information received in step S1130 (S1140).

The SA transmission and the D2D data transmission may be simultaneously performed or the D2D data may be transmitted after the SA is transmitted.

Meanwhile, although not illustrated in FIG. 11, the D2D transmitting UE requests a transmission resource (that is, a PSSCH resource) for the D2D data to the base station and the base station may schedule resources for transmitting the SA and the D2D data. To this end, the buffer status report (BSR) procedure may be performed so that the D2D transmitting UE transmits the scheduling request (SR) to the base station and thereafter, the base station determines the quantity of resources requested by the D2D transmitting UE.

Herein, Since the SR is the SR for requesting allocation of not the PUSCH resource but the PSSCH resource, the SR may be distinguished from the SR for requesting the PUSCH resource. To this end, in order to distinguish the SR for the PSSCH from the SR for the PUSCH, a PUCCH resource index (that is, the PRB in which the SR is transmitted), a cyclic shift (CS) applied to the basic sequence (e.g., ZC sequence) for frequency domain spread of the SR, and an orthogonal code (OC) for time domain spread of the SR may be differently configured.

When the D2D Rx UEs monitor the control information pool and decodes control information associated therewith, the D2D Rx UEs may selectively decode D2D data transmission associated with the corresponding control information.

The D2D grant serves to allocate the resources which the D2D Tx UE requires for transmitting the SA and the data and transfer the control information including the MCS, and the like, that is, the scheduling information, as described above.

Further, since the SCI is used for scheduling the PSSCH from the viewpoints of the D2D Tx UE and the D2D Rx UE, a DCI format for the D2D grant proposed in the present invention may be used for scheduling the PSSCH and include field information of the SCI.

The DCI format for the D2D grant (alternatively, the sidelink grant) includes both the scheduling for the SA and the data as described above, but a resource allocation assignment/allocation (RA) field (alternatively, information) for the SA and an RA field (alternatively, information) for the data may be distinguished from each other.

For example, the DCI format for the D2D grant may be constituted by a frequency hopping flag (FH) field, a resource allocation (RA) field for the D2D SA, a first RA field for the D2D data, a second RA field for the D2D data, a TPC field, and a zero padding (ZP) bit(s) (a case in which the ZP bit(s) is(are) present).

The FH field indicates whether frequency hopping is applied at the time of transmitting the SA and the data. Since the FH field may be commonly applied to the SA transmission and the data transmission, the FH field may be constituted by one field.

For example, when an FH field value is '1', the D2D Tx UE performs frequency hopping transmission at the time of transmitting the SA and the data and when the FH field value is '0', the D2D Tx UE does not perform the frequency hopping transmission at the time of transmitting the SA and the data.

The SA RA field (alternatively, a PSCCH RA field, a resource field for the PSCCH) indicates resource information for the SA transmission. That is, the SA RA field indicates scheduling information (that is, resource information) for PSCCH transmission. Therefore, the D2D Tx UE transmits the SA (that is, the PSCCH) in a resource indicated by the SA RA field.

Herein, the SA RA field may also include information (alternatively, an index) for deriving a time for the SA transmission and/or a position of the frequency resource area.

For example, the SA RA field may announce a start position (that is, the index) of the resource for the SA transmission. In other words, the SA RA field may indicate a start index of a subframe and/or a resource block in which the SA is transmitted.

Further, the D2D Tx UE may derive a time resource (e.g., a subframe index) and/or a frequency resource (e.g., a resource block index) for the SA transmission by using a predetermined function (equation) based on the information included in the SA RA field.

The resource allocation information for the D2D data transmission may be constituted by a D2D data first RA field (alternatively, a first PSSCH RA field, a resource block allocation and hopping resource allocation field), a D2D data second RA field (alternatively, a second PSSCH RA field, a time resource pattern field).

The D2D data first RA field indicates the resource information (e.g., the resource block) for the D2D data transmission in the frequency domain. That is, the D2D data first RA field indicates the scheduling information in the frequency domain for the PSSCH transmission. Therefore, the D2D Tx UE transmits the D2D data (that is, the PSSCH) in a frequency resource indicated by the D2D data first RA field.

For example, the D2D data first RA field may indicate a start position (that is, a start resource block index) of the resource block for the D2D data transmission and the length of the allocated resource block by using a resource indication value (RIV) like a UL RA scheme.

Further, the D2D data first RA field may separately and announce the start position (that is, the start resource block index) and an end position (that is, a last resource block index) of the resource block for the D2D data transmission as separate fields (alternatively, information). In this case, an additional bit (e.g., 1 bit) may be further required.

The D2D data second RA field indicates resource information (e.g., the subframe) used for the D2D data transmission in the time domain. That is, the D2D data second RA field indicates the scheduling information in the time domain for the PSSCH transmission. Therefore, the D2D Tx UE transmits the D2D data (that is, the PSSCH) in a time resource indicated by the D2D data first RA field.

For example, the D2D data second RA field may indicate a subframe pattern (that is, a time resource pattern) to be used for the D2D data transmission. That is, the D2D data second RA field may include information indicating the time resource pattern used for the PSCCH transmission.

Herein, the D2D data second RA field may indicate any one pattern of a plurality of predetermined time resource patterns. For example, n subframe patterns (expressed by a bitmap) may be pre-defined like SF pattern #0(10001010), SF pattern #1(00111001), . . . , SF pattern #n(10011001) and the D2D data second RA field may indicate any one subframe pattern of n defined subframe patterns. Herein, a value of '1' of the bitmap may mean that the D2D data is transmitted in a corresponding subframe and a value of '0' may mean that the D2D data is not transmitted in the corresponding subframe. Further, the values of the bitmap may have meanings contrary thereto.

A TPC field indicates transmission power for the SA and data transmission in the D2D Tx UE. That is, the TPC field indicates transmission power information of the PSCCH and the PSSCH.

The TPC field may be constituted by one field. As such, when the TPC field is constituted by one field, the TPC field value is commonly applied to the transmission power for the SA transmission and the transmission power for the data transmission.

The ZP may be filled with the control information, not used, or not present as necessary. That is, when the ZP is not required, the ZP may be omitted.

Each field order and a bit count of each bit of the DCI format exemplified as above are just one example for easy description and may be modified.

Meanwhile, as compared with DCI format 0 given above, the DCI format for the D2D grant exemplified as above may not include the MCS field.

When the eNB announces the MCS value to the D2D Tx UE, the MCS field needs to be present in the DCI format for the D2D grant. However, the D2D Tx UE may autonomously determine the MCS value or the MCS value may be transferred through the higher layer signaling (e.g., the RRC signaling) or determined as a pre-fixed value. Accordingly, the D2D grant does not include the MCS field.

Further, the DCI format for the D2D grant exemplified as above may not include even the NDI field and the RV field. Similarly to the above, the D2D Tx UE may autonomously determine the NDI and RV values or the NDI and RV values may be transferred through the higher layer signaling (e.g., the RRC signaling) or determined as pre-fixed values.

Method for UE Clustering Taking into Account Link Stability and Energy Efficiency for a Disaster Communication Network A disaster communication network refers to a wireless communication network for protecting lives, environment, and assets.

Despite its importance, technologies for the disaster communication network are far behind the technologies of commercial communication networks. In order to utilize the technologies of commercial communication networks that have evolved with an unprecedented development speed, the NPSTC (National Public Safety Telecommunications Council) has designated the LTE as the platform for the disaster communication network. Recently various technologies are being researched to advance the technologies for the disaster communication network.

To satisfy the mission-critical requirement of the disaster communication network, it should be able to transmit text, image, and video data even in the situation of a disaster, terror, and war. In such a situation, it is expected that eNBs and wired backbone networks are unavailable; therefore, UEs should be able to exchange information through the D2D communication method described above.

To this purpose, a portion of nodes belonging to the disaster communication network becomes a head node to support efficient D2D communication. A 'head node(s)' performs communication with the nodes belonging to itself and may form a wireless backbone connected to other head node(s). Those nodes other than the head node may be called 'leaf nodes', where a leaf node(s) selects a head node closest to itself as the head node to which it belongs. Also, a leaf node belonging to a specific head node may be called a 'member node' of the corresponding head node.

The present invention proposes a method for constructing a disaster communication network having high energy efficiency and link stability in such a situation where eNBs and wired backbone networks are not available.

Energy efficiency is important in improving survival time of a disaster communication network, and link stability is an indispensable element to deliver information in a reliable manner. To construct a disaster communication network having high energy efficiency and link stability, it is important to select a head node(s) properly from among the entire nodes. Selecting a head node(s) may be considered as a clustering problem involving a very difficult, complicated combinatorial optimization.

Conventional clustering algorithms have been proposed in terms of mobile ad-hoc, vehicular ad-hoc, or sensor network. The clustering algorithms such as LEACH (Low Energy Adaptive Clustering Hierarchy), EEHC (Energy Efficient Hierarchical Cluster), EEHC (Energy Efficient Hierarchical Cluster), and HEED (Hybrid Energy-Efficient Distributed) clustering, and EECS (Energy Efficient Clustering Schema) algorithm aim to select a node with high residual energy as a head node to extend the survival time of the network. LEACH-Centralized (LEACH-C) and K-mean clustering have the same goal as that of the present invention in that they aim to reduce energy consumption of the overall network, but do not take into account link stability to ensure reliable delivery of information.

The present invention proposes a new clustering algorithm based on the recently published AP (Affinity Propagation) technique to construct a disaster communication network. AP uses the message delivery technique, which is a state-of-the-art clustering technique in the computer science field. Compared with the conventional clustering methods, AP exhibits high clustering performance and low complexity and is easy to use for applying various constraints on the optimization problem, which may be regarded as an optimal solution to the clustering problem of the disaster communication network.

Channel Model and Network Structure

In what follows, the present invention assumes a disaster communication network with N nodes distributed over the area of S.

Suppose Equation 1 expresses the receive power of a signal that a node j receives with respect to a signal that a node i transmits. Then receive SNR (Signal-to-Noise Ratio) at node j may be expressed by Equation 2.

$$P_{ij}^{rx} = P_i G d_{ij}^{-\alpha} \qquad \text{[Equation 1]}$$

$$SNR_{ij} = \frac{P_i G d_{ij}^{-\alpha}}{\sigma^2} \qquad \text{[Equation 2]}$$

In Equation 1 and Equation 2, $P_i$, G, $d_{ij}$, $\alpha$, and $\sigma^2$ represent transmit power of node i, fixed path-loss, distance between node i and node j, path-loss exponent, and noise power, respectively.

At this time, in case the receive SNR at node j is larger than the SNR threshold $\gamma$ (namely $SNR_{ij} \geq \gamma$), the link between node i and node j may be regarded as a reliable link.

Therefore, the distance that allows stable communication through transmit power P may be derived by Equation 3 below.

$$d_{max}(P) = \left(\frac{PG}{\gamma \sigma^2}\right)^{1/\alpha} \qquad \text{[Equation 3]}$$

FIG. 12 illustrates a communication network comprising head nodes and leaf nodes according to one embodiment of the present invention.

Referring to FIG. 12, head nodes perform a portion of the roles of the eNB. A head node provides synchronization, resource allocation, and initial connection to the leaf nodes that belong to the head node, cooperates neighboring head nodes for interference avoidance and handover, and relay data. A leaf node selects a head node closest to itself as the head node to which it belongs.

A link established between a head node and a leaf node (namely member node) belonging to the head node may be called an intra-cluster link while a link established between head nodes may be called an inter-cluster link.

In what follows, in this document, a set of head nodes is denoted as V, and a set of lead nodes (namely member nodes) belonging to a head node j is denoted as N_j.

The present invention aims to minimize two types of energy consumption in a disaster communication network.

The first type of energy is the energy consumed by a head node, and the second type of energy is the energy consumed for communication between a head node and a leaf node.

The energy consumed in a head node j, which is constant irrespective of $N_j$ for most cases, may be modeled as $w_c$.

On the other hand, more energy is consumed for communication between the head node j and a leaf node i in proportion to the distance between them, which may be modeled by Equation 4 below.

$$w_m(d_{ij}) = \frac{\gamma \sigma^2 d_{ij}^\alpha}{G} \qquad \text{[Equation 4]}$$

The present invention assumes a full traffic model in which leaf nodes always communicate with a head node, which is widely used for performance analysis in a wireless communication network.

In order to minimize energy consumption of a network, stable connection of a disaster communication network should be considered necessarily; to this purpose, constraints on two types of connectivity, intra-cluster and inter-cluster connectivity have to be satisfied.

Intra-cluster connectivity indicates such a situation where head nodes have to be connected reliably to the leaf nodes belonging to them, which may be expressed by Equation 5 below.

$$d_{ij} \leq d_{intra}, \forall j \in v, \forall i \in \mathcal{N}_j \qquad \text{[Equation 5]}$$

In Equation 5, $d_{intra}$ represents the maximum distance between a head node and a leaf node (or a threshold distance to form a stable link), and $d_{intra} = d_{max}(P_{intra})$. At this time, $P_{intra}$ represents the maximum communication power between a head node and a leaf node.

In other words, if distance between a head node j and a leaf node i (namely $d_{ij}$) is shorter than $d_{intra}$, a stable link is formed between the head node j and the leaf node i.

Inter-cluster connectivity describes such a situation where head nodes have to be connected to all of the other head nodes through a single stable link (namely one hop) or through stable links among a plurality of head nodes (namely multi-hops).

This may be expressed as matrix C(V)=matrix 1. At this time, C(V) represents a connectivity check matrix, and the matrix 1 represents a matrix of all ones, including diagonal elements having a size of |V|×|V|. Therefore, diagonal elements of the matrix C(V) are all ones; $c_{mn}$ is 1 when the m-th head node and the n-th head node are connected to each other through a single stable link or links among a plurality of head nodes, but 0 otherwise.

The maximum communication power among head nodes is denoted by $P_{inter}$, and a stable link is formed when the distance between two head nodes is shorter than the maximum distance between the head nodes, $d_{inter} = d_{max}(P_{inter})$.

Since communication among head nodes has a great influence on the performance of a disaster communication network, higher transmit power, lower modulation order, and lower code rate are allowed compared with the communication between a head node and a leaf node. In the proposed model, the aforementioned property is reflected by assigning higher transmit power to $P_{inter}$ than $P_{intra}$ ($P_{inter} \geq P_{intra}$).

Equation 6 below may calculate the optimization problem, which takes into account energy efficiency and link stability in a disaster communication network.

$$\text{minimize} \sum_{j \in \mathcal{V}} \sum_{i \in \mathcal{N}_j} w_m(d_{ij}) + \sum_{j \in \mathcal{V}} w_c \quad \text{[Equation 6]}$$

$$\text{subject to } d_{ij} \leq d_{intra}, \forall j \in \mathcal{V}, \forall i \in \mathcal{N}_j$$

$$C(\mathcal{V}) = 1.$$

In other words, a disaster communication network according to the present invention proposes a method for minimizing energy consumed in a head node (namely $w_c$) and minimizing energy consumed from communication between the head node and a leaf node (namely $w_m(d_{ij})$).

The optimization problem above is a kind of complex, nonlinear programming problem, which requires highly complex, combinatorial optimization techniques.

Affinity Propagation (AP)-Based Clustering Algorithm

1) Affinity Propagation (AP)

AP, which uses similarity values that are real numbers as input values, aims to select head nodes so that the sum of similarity values may be maximized.

The similarity s(i, j) of node i indicates how appropriate it is to select node j as its head node.

The preference s(j, j) of node j indicates how appropriate it is for node j to become a head node.

Preference may be called self-similarity and is related to the number of clusters generated through AP (namely the number of head nodes).

AP assumes that every node is potentially a head node and determines head nodes by exchanging messages repeatedly among nodes through D2D communication.

AP defines two types of messages: responsibility and availability messages. In other words, AP determines head nodes by exchanging two types of messages, responsibility and availability, repeatedly through D2D communication.

The responsibility r(i, j) is an index indicating how much node i prefers node j as its head node, as determined by node i.

And the availability a(i, j) is an index indicating how appropriate it is for node j to be a head node of node i, as determined by node j.

The responsibility r(i, j) of node i for a potential head node j is updated by Equation 7 below.

$$r(i, j) = s(i, j) - \max_{j's, t, j' \neq j}\{a(i, j') + s(i, j')\}. \quad \text{[Equation 7]}$$

Referring to Equation 7, the responsibility value is updated by taking into account the relationship with neighboring nodes (namely availability, similarity) in a collective manner.

To describe more specifically, node i determines the responsibility with respect to node j by subtracting the sum of availability and similarity values of a node showing the maximum value among all of nodes except for node j from the similarity value with respect to the node j. In other words, according to Equation 7, the more the similarity to node j (namely, the closer node i is located) and the smaller the possibility for the node i to form the head-member relationship (namely the leaf node relationship where node i is a head node and other neighboring nodes other than node j belong to the node i) with other neighboring nodes other than the node j, the responsibility value may be updated by a large value.

The availability a(i, j) of the potential head node j to node i is updated by Equation 8 below.

$$a(i, j) = \min\{0, r(j, j) + \Sigma_{i's, t, i' \notin \{i, j\}}\{0, r(i', j)\}\}. \quad \text{[Equation 8]}$$

Referring to Equation 8, the availability value is updated by taking into account the relationship with respect to neighboring nodes (namely responsibility) in a collective manner. In other words, Equation 8 indicates that the availability value to node i is updated by a larger value as a more number of neighboring nodes other than node i prefer node j as a head node.

Also, self-availability of the potential head node j is updated by Equation 9 below.

$$a(j, j) = \Sigma_{i's, t, i' \neq j} \max\{0, r(i', j)\} \quad \text{[Equation 9]}$$

Referring to Equation 9, the self-availability is very important for determining whether a specific node may become a head node, which is determined by summing all of responsibility indices showing how much neighboring nodes prefer the node as a head node. In other words, the self-availability value is updated more greatly as a more number of neighboring nodes prefer the node as a head node.

As a result, node i selects a head node j which maximizes the value of a(i, j)+r(i, j) as its head node, and in case i=j, the node i itself becomes the head node.

As described above, if message update is performed by a predetermined number of times, or the same head node is selected for a predetermined number of times, message delivery may be stopped.

2) Similarity Modeling

Through similarity modeling, the optimization problem proposed by Equation 6 may be embedded into the AP.

The similarity from node i to node j is defined by Equation 10.

$$s(i, j) = \begin{cases} -w_m(d_{ij}), & \text{if } d_{ij} \leq d_{intra}, \\ -\infty, & \text{elsewhere.} \end{cases} \quad \text{[Equation 10]}$$

By using Equation 10, the problem of minimizing energy consumption in a disaster communication network may be considered to be the same as the problem of minimizing similarity in the AP. In other word, the two minimization problems may be interpreted to have the same implication.

In case a leaf node selects a node placed at a distance larger than $d_{intra}$ as its head node, the sum of similarity values becomes $-\infty$, AP does not make a selection in such a case, and the number of head nodes is increased automatically if needed. Therefore, connectivity within a cluster is always maintained through the above similarity modeling.

The preference of node j is defined by Equation 11 below.

$$s(j, j) = \begin{cases} p & \text{if node } j \text{ is eligible for a head node,} \\ -\infty & \text{otherwise,} \end{cases} \quad \text{[Equation 11]}$$

In other words, in case node j is eligible for a head node, s(j, j) has a p value. In this case, p is smaller than 0.

On the other hand, in case node j is not able to be a potential head node due to the problem such as high mobility, low residual energy, and node type, preference becomes $-\infty$. The p value is related to the number of clusters generated through AP and is determined through the algorithm proposed by the present invention described below.

3) Clustering Algorithm Proposed by the Present Invention

In 2) above, the problem of a disaster communication network has been embedded into the AP through similarity modeling, and the output value of AP is V and $N_j$.

AP selects head nodes that minimize energy consumption while ensuring intra-cluster connectivity with respect to |V| clusters. The total sum of energy consumption when inter-cluster connectivity is satisfied is expressed by Equation 12.

In other words, if AP is performed, a head node and a leaf node (namely member node) belonging to the corresponding head node is determined, and Equation 12 defines the amount of energy consumed over the whole network for this case.

$$E(p) = \sum_{j \in V} \left[ \sum_{i \in N_j} w_m(d_{ij}) + w_c \right]$$ [Equation 12]

In Equation 12, E(p) represents the sum of energy consumption according to the result (namely the cluster formed by performing AP) of performing the AP when the preference value is p. At this time, E(p), which is the sum of energy consumption, is determined by summing all of the sum of energy consumed within the cluster and the sum of energy consumed from inter-cluster relationship.

In case the output of AP does not satisfy inter-cluster connectivity, a desired limiting condition is not satisfied irrespective of the sum of energy consumption; therefore, E(p) is assumed to be $\infty$.

The number of clusters influences the total energy consumption. As the number of clusters is increased, the distance between a head node and a leaf node gets closer, and the number of leaf nodes is reduced, leading to reduction of the sum of $w_m(d_{ij})$.

On the other hand, $w_c$ that is the energy consumed as a head node increases in proportion to the number of clusters.

The number of clusters has an influence on link connectivity; if the number of clusters is too small, one or two connectivity conditions may not be satisfied.

The present invention proposes an algorithm seeking the number of clusters appropriate for the optimization problem of Equation 6 through preference adaptation. The preference adaptation refers to the process of adjusting the size of preference value, which is a clustering parameter, to obtain a final clustering result.

Finding an appropriate value of the preference to determine the number of clusters is a far complicated and difficult problem; the present invention proposes an algorithm for finding a preference value through efficient preference adaptation by using golden section search.

To perform preference adaptation by using golden section search, preference triplet ($\Phi_{min}$, $\Phi_c$, $\Phi_{max}$) is needed first.

A preference triplet refers to a triplet formed by selecting three preference values for performing preference adaptation by using golden section search algorithm from among the preference values by which AP has been already performed. A preference triplet is continuously updated during the preference adaptation process and is used to determine which search range for a new preference value to find a final preference or how to find a new preference value.

The preference triplet has to satisfy the following relationship: $\Phi_{min} < \Phi_c < \Phi_{max}$, $E(\Phi_{min}) > E(\Phi_c)$, and $E(\Phi_{max}) > E(\Phi_c)$. $E(\Phi_{min})$, $E(\Phi_c)$, and $E(\Phi_{max})$ may be calculated by Equation 12.

FIG. 13 illustrates a terminal clustering algorithm according to one embodiment of the present invention.

The clustering algorithm according to the present invention comprises a) a preference adaptation process to find an initial preference triplet and b) a preference adaptation process based on golden section search.

First, a preference adaptation process to find a preference triplet is performed.

A preference adaptation process to find a preference triplet is based on $\hat{p}(K)$ using an intermediate variable K.

$\hat{p}(K)$ represents the preference p by which K clusters may be generated through AP. $\hat{p}(K)$ and $K_0$ are derived in 4) below.

Step 1: the initial value is set. In other words, $p^{(1)} = \hat{p}(K_0)$ and $p^{(2)} = \hat{p}(K_0 + \Delta K)$ are set as the preference. At this time, $K_0$ represents the initial value of K, and $\Delta K$ represents the amount of change of K. And $\Phi$, $\Phi_c$ are set to 0, the final preference value $p_r$ is set to 0, and l is set to 2.

Step 2: sum of energy consumption due to the result determined by performing AP (in other words, a cluster determined by performing AP) when preference is $p^{(1)}$ and $p^{(2)}$ respectively.

And by comparing the sum of energy consumption with respect to $p^{(1)}$ (namely $E(p^{(1)})$) with the sum of energy consumption with respect to $p^{(2)}$ (namely $E(p^{(2)})$), whether to increase or decrease the preference is determined. In other words, whether to increase or decrease the number of clusters (K) is determined.

More specifically, if $E(p^{(1)}) > E(p^{(2)})$, w has the value of 1. In other words, since energy consumption gets small when the preference value is increased, the preference value is determined to be increased. On the other hand, if $E(p^{(1)}) < E(p^{(2)})$, w has the value of $-1$. In other words, since energy consumption gets large when the preference value is increased, the preference value may be determined to be decreased.

At this time, if $\Delta K$ is set to be sufficiently large, the result that w=0 may not be derived. Also, if w=0, $\Delta K$ may be set to be larger so that w may be determined again.

Step 3 to 8: the initial preference triplet required for golden section search is determined by performing AP by increasing or decreasing the preference value (the result of Step 2 determines whether to increase or decrease the preference value). In other words, the initial value of the preference triplet is determined.

If $E(p^{(1)}) > E(p^{(2)})$ or $E(p^{(1)}) = E(p^{(2)}) = \infty$ (namely, w=1), AP is performed by using the value of $p^{(l)} = p(K+(l-1)\Delta K)$, for l>3 as the preference value (Step 5 and 6) until L is found so that L satisfies $E(p^{(L-1)}) < E(p^{(L)})$ (Step 7). At this time, the initial preference triplet ($\Phi_{min}$, $\Phi_c$, $\Phi_{max}$)=($p^{(l-w-1)}$, $p^{(l-1)}$, $p^{(l+w-1)}$)=($p^{(L-2)}$, $p^{(L-1)}$, $p^{(L)}$) (Step 8).

Meanwhile, if $E(p^{(1)}) < E(p^{(2)})$ (namely, w=-1), AP is performed by using the value of $p^{(l)} = p(K+(l-2)\Delta K)$, for l>3 as the preference value (Step 5 and 6) until L is found so that L satisfies $E(p^{(L-1)}) < E(p^{(L)})$ (Step 7). At this time, the initial preference triplet ($\Phi_{min}$, $\Phi_c$, $\Phi_{max}$)=($p^{(l-w-1)}$, $p^{(l-1)}$, $p^{(l+w-1)}$)=($p^{(L)}$, $p^{(L-1)}$, $p^{(L-2)}$) (Step 8).

Next, preference adaption is performed by using golden section search after the initial preference triplet is found.

Step 9 to 15: the preference triplet is updated by performing AP repeatedly by using golden section search. And the final preference value is determined.

The golden section search algorithm narrows the range of the preference while maintaining the distance ratio between the elements of the preference triplet as $\lambda=(1+\sqrt{5})/2$. Through the preference triplet $(\Phi_{min}, \Phi_c, \Phi_{max})$, a new preference value $\Phi$ is calculated. A new preference triplet is obtained from $(\Phi_{min}, \Phi_c, \Phi, \Phi_{max})$ from the preference triplet $(\Phi_{min}, \Phi_c, \Phi_{max})$ and the result of performing AP by using $\Phi$ value as a preference value. In other words, the golden section search algorithm updates the preference triplet (Step 12 and 13).

If $\Phi_{max}-\Phi_{min}<\epsilon|\Phi_c+\Phi|$, the repetitive preference adaptation process is terminated (Step 14). At this time, E represents a termination threshold value.

The value that gives the minimum energy consumption value among the values belonging to a updated preference triplet is determined as the final preference value.

More specifically, the final preference value $p_r=\Phi_c$ if $E(\Phi)>E(\Phi_c)$, and $p_r=\Phi$ if $E(\Phi)<E(\Phi_c)$. In other words, the sum of energy consumption at $\Phi$ is compared with the sum of energy consumption at $\Phi_c$, and the value that gives the smaller of the two sums is determined as the final preference value.

Step 20: a head node and member nodes belonging to the head node are determined based on the result of performing AP by using the preference value finally determined through Step 9 to 15 (namely $p_r$) as a parameter. In other words, the final output is V and $N_j$s when the preference value is $p_r$.

4) Determination of $\hat{p}(K)$ and $K_0$

First, a method for determining $\hat{p}(K)$ will be described.

The relationship between preference and the number of clusters in AP is determined by the total number of nodes N, size of total area S, similarity function, and positions of nodes.

It is highly complicated to derive an accurate relationship while taking into account all of the variables above; therefore, the present invention approximates the preference value required to form K clusters for performing AP by using $\hat{p}(K)$ based on the average value of node positions.

To this purpose, given that the number of preferences is p, and the number of clusters is K, Equation 13 defines the sum of similarity and preference as follows.

$$R(\mathcal{V}_K, \mathcal{N}_1, \ldots, \mathcal{N}_K) := \sum_{j\in\mathcal{V}_K}\left\{\sum_{i\in\mathcal{N}_j} s(i,j) + p\right\} \quad \text{[Equation 13]}$$

In Equation 13, $\mathcal{V}_K$ represents a set of K head nodes, and $N_1$ represents a set of leaf nodes (namely member nodes) belonging to the head node j.

The similarity function assumes the following form as expressed by Equation 14 below.

$$s(i,j) = -\beta d_{ij}^\alpha \quad \text{[Equation 14]}$$

$\mathcal{V}_K$ and $N_j$ are determined by clustering algorithm. If it is assumed for the purpose of analysis that leaf nodes are distributed uniformly around a head node in a circle of radius $d(K)=\sqrt{S/\pi K}$, the expected value of $R(\mathcal{V}_K, N_1, \ldots, N_K)$ is derived by a function of p and K as expressed by Equation 15 below.

$$\hat{R}(p, K) = \mathbb{E}_d[R(\mathcal{V}_K, \mathcal{N}_1, \ldots, \mathcal{N}_K)] \quad \text{[Equation 15]}$$
$$= \sum_{j\in\mathcal{V}_K}\sum_{i\in N_j} \bar{s}(K) + \sum_{j\in\mathcal{V}_K} p$$
$$= -\frac{2\beta(N-K)}{\alpha+2}\left(\frac{S}{\pi K}\right)^{\alpha/2} + Kp$$

In Equation 15, $\bar{s}(K)$ represents mean similarity when there are K clusters and is calculated by Equation 16 below.

$$\bar{s}(K) = \int_0^{2\pi}\int_0^{d(K)} \frac{1}{\pi(d(K))^2}(-\beta r^\alpha)rdrd\theta = -\frac{2\beta(d(K))^\alpha}{\alpha+2} \quad \text{[Equation 16]}$$

Since it is assumed that leaf nodes are evenly distributed around a head node in a circle of radius $d(K)=\sqrt{S/\pi K}$, the result shown at the bottom of Equation 15 is derived by applying the result of Equation 16 to Equation 15.

Referring to Equation 15, as the number of clusters is increased, sum of similarities is reduced, and sum of preferences is increased in proportion to the number of clusters K.

For a given preference p, the number of clusters K that maximizes the sum of similarity and preference is derived through AP.

The number of clusters for a given p may be estimated as $\hat{K}(p)=\text{argmax}_K \hat{R}(p, K)$, and in this case, it is very difficult to estimate $R(p)$ due to the condition that K is an integer.

Therefore, a relaxation technique is adopted, which assumes that $K\in[1,N]$ is a real number. Equation 17 below may be used to obtain a partial derivative of $\hat{R}(p, K)$ with respect to K.

$$\frac{\partial \hat{R}(p, K)}{\partial K} = \frac{\beta(2K+\alpha(N-K))}{K(\alpha+2)}\left(\frac{S}{\pi K}\right)^{\alpha/2} + p \quad \text{[Equation 17]}$$

In case $2\leq\alpha$, Equation 17 gives a monotonically decreasing, continuous function of $K\in[1,N]$. Therefore, $\hat{R}(p, K)$ has a unique maximum value for a given p<0.

$\hat{p}(K)$ and $\hat{K}(p)$ all estimate the relationship between preference and the number of clusters, where $\hat{p}(K)$ is an inverse relation of $\hat{K}(p)$.

Since the p value that makes Equation 17 equal to zero forms a one-to-one function for K, it may be concluded that p(K) is the p value that makes Equation 17 equal to zero for a given K. Therefore, p(K) may be expressed by Equation 18 below.

$$\hat{p}(K) = -\frac{\beta(2K+\alpha(N-K))}{K(\alpha+2)}\left(\frac{S}{\pi K}\right)^{\alpha/2} \quad \text{[Equation 18]}$$

The $\hat{p}(K)$ derived by Equation 18 is used for preference adaptation of the clustering algorithm proposed by the present invention.

Next, a method for determining $K_0$ will be described.

$K_0$ is determined as the minimum number of clusters that satisfy a connectivity limiting condition. The minimum number of clusters satisfying the connectivity limiting condition is determined by the size of the total area (S), the maximum distance between a head node and a member node within a cluster ($d_{intra}$), and the maximum distance between head nodes ($d_{inter}$).

At this time, the total area S corresponds to the area that is covered by the entire clusters, and $d_{intra}$ and $d_{inter}$ determine the maximum size of a cluster. In other words, in case $d_{intra} < d_{inter}/2$) intra-connectivity has a greater influence on determining the maximum size of a cluster while, in case $d_{intra} \, d_{inter}/2$ inter-cluster connectivity has a greater influence on determining the maximum size of a cluster. Therefore, $K_0$ may be estimated by Equation 19 below.

$$K_0 = \left\lceil \min\left(\frac{S}{\pi(d_{intra})^2}, \frac{S}{\pi(d_{inter}/2)^2}\right)\right\rceil \qquad \text{[Equation 19]}$$

In Equation 19, $\lceil x \rceil$ returns the minimum integer not less than x.

FIG. 14 illustrates a terminal clustering method according to one embodiment of the present invention.

Referring to FIG. 14, a UE determines the initial preference value S1401.

At this time, the initial preference value may be determined as the value that generates a predetermined number of initial clusters according to the AP scheme.

Also, the number of initial clusters may be determined by the size of total area (namely the area to which the entire UEs belong), the maximum distance between a head UE and member UEs within a cluster, and the maximum distance between head UEs.

The UE determines an initial preference triplet by performing the AP method while increasing or decreasing the preference value S1402.

At this time, whether to increase or decrease the preference value may be determined by comparing energy consumption of the entire UEs according to the initial preference value with energy consumption of the entire UEs according to a value obtained by adding an amount of change to the initial preference value.

Also, the initial preference triplet may be determined if an increased or decreased current preference value is larger than a previous preference value.

The UE updates the preference triplet through Golden Section Search (GSS) method on the basis of the initial preference triplet S1403.

At this time, the preference value may be derived through the GSS method by using the initial preference triplet. And the preference triplet may be updated by using a result of performing the AP method based on a preference value derived through the GSS method and by using the initial preference triplet.

The UE determines the final preference value to minimize energy consumption of the entire UEs from the updated preference triplet S1404.

At this time, the final preference value may be determined if a difference between the maximum and the minimum preference values of the updated preference triplet is smaller than a value obtained by applying a predetermined termination threshold to the difference between a middle preference value of the updated preference triplet and the preference value derived through the GSS method.

Also, energy consumption of the entire UEs may be the sum of the energy consumed in a head UE and the energy consumed for communication between the head UE and member UEs belonging to the head UE.

By performing the AP method by using the final preference value, the UE determines a head UE and member UEs belonging to the head UE S1405.

A simulation study has been conducted to check accuracy of $\hat{p}(K)$ derived by Equation 17, where the simulation result is shown in the following figure.

FIG. 15 illustrates a simulation result of a terminal clustering method according to the present invention.

The simulation assumes a situation in which $\alpha=4$, $\beta=1$, and N=400 or 1000 over the entire area (S) of 10 km×10 km. As shown in FIG. 15, the relationship between the preference and the average number of clusters derived above well estimates the actual relationship.

In what follows, a simulation result for evaluating performance of the clustering algorithm according to the present invention will be described. The simulation study was performed by using the following model.

The simulation study assumes that N nodes are randomly distributed across the entire area of 10 km×10 km. And the path-loss model employs 128+40 log(d) km, noise power is −120 dBm, SNR threshold value is 3 dB, and the maximum transmit power $P_{intra}=17$ dBm and $P_{inter}=26$ dBm. The termination threshold is 0.001 in the preference adaptation process. Message delivery is either repeated 1000 times or terminated when the same head node is selected 100 times.

The clustering algorithm according to the present invention is compared with K-medoids algorithm. K-medoids algorithm is applied repeatedly 50 times on the initial head nodes different from each other, and performance is analyzed out of the 50 applications only when connectivity condition is satisfied. Performance is evaluated by averaging 100 independent user distributions.

FIG. 16 illustrates a simulation result of a terminal clustering method according to the present invention.

FIG. 16 compares the clustering algorithm according to the present invention with K-medoids algorithm in terms of average total power consumption due to the number of public safety nodes.

It is assumed that a head node consumes power of $w_c=20$ dBm.

As shown in FIG. 16, the average total power consumption gradually increases according to the increase of the number of nodes. Irrespective of the number of nodes, the clustering algorithm according to the present invention always exhibits better performance than K-medoids algorithm when the number of clusters is 25, 30, and 35.

FIG. 17 illustrates a simulation result of a terminal clustering method according to the present invention.

FIG. 17 illustrates how the average total power consumption of the clustering algorithm according to the present invention varies according to the power consumption of a head node $w_c$.

It is assumed that the total number of nodes N is 400.

The simulation study shows that the clustering algorithm of the present invention always exhibits smaller power consumption than K-medoids algorithm when the number of clusters is 30, 40, and 60. This property is the same irrespective of $w_c$. The clustering algorithm of the present invention shows 10% smaller power consumption than the smallest power consumption that may be achieved by applying K-medoids algorithm.

FIG. 18 illustrates a simulation result of a terminal clustering method according to the present invention.

FIG. 18 illustrates the average number of clusters generated by the clustering algorithm of the present invention according to the number of public safety nodes and $w_c$. The clustering algorithm of the present invention finds the number of clusters that minimizes power consumption and at the same time, satisfies the connectivity limiting condition.

FIGS. 15 to 18 show that the number of clusters generated by the clustering algorithm of the present invention is similar to the number of clusters found by applying K-medoids algorithm that minimizes power consumption. Since the sum of $w_c$ exerts a greater influence according as $w_c$ is increased and the number of nodes is decreased, a smaller number of clusters are generated. However, in case $w_c$=30 dBm, a head node consumes significant power; therefore, the minimum number of clusters satisfying the connectivity limiting condition is always generated irrespective of the number of nodes.

FIG. 19 illustrates a simulation result of a terminal clustering method according to the present invention.

FIG. 19 illustrates average total power consumption according to the portion of nodes eligible for head nodes.

It is assumed that the total number of nodes N is 400, and the power $w_c$ consumed by a head node is 20 dBm.

FIGS. 17 to 19 all assume that every node is eligible to be a head node. Since the possibility of selecting a head node capable of minimizing power consumption is reduced according as the portion of nodes eligible for head nodes is decreased, average total power consumption is increased. Performance degradation becomes more sensitive to the ratio of nodes eligible for head nodes according to $w_c$ is decreased; this is so because the number of clusters generated by the clustering algorithm of the present invention is increased. And this is so because optimization is performed with less margin according as the number of nodes eligible for head nodes is small while the number of clusters generated is large.

Apparatus to which the Present Invention may be Applied

FIG. 20 illustrates a block diagram of a wireless communication apparatus according to one embodiment of the present invention.

With reference to FIG. 20, a wireless communication system comprises an eNB 2010 and a plurality of UEs 2020 located within the communication range of the eNB 2010.

The eNB 2010 includes a processor 2011, a memory 2012, and an RF (Radio Frequency) unit 2013. The processor 2011 implements functions, processes and/or methods proposed in FIG. 1 to FIG. 19. The layers of a wireless interface protocol may be implemented by the processor 2011. The memory 2012 is connected to the processor 2011 and stores various information for driving the processor 2011. The RF unit 2013 is connected to the processor 2011 and transmits and/or receives radio signals.

The UE 2020 includes a processor 2021, a memory 2022, and an RF (Radio Frequency) unit 2023. The processor 2021 implements functions, processes and/or methods proposed in FIG. 1 to FIG. 19. The layers of a wireless interface protocol may be implemented by the processor 2021. The memory 2022 is connected to the processor 2021 and stores various information for driving the processor 2021. The RF unit 2023 is connected to the processor 2021 and transmits and/or receives radio signals.

The memory 2012, 2022 may be located inside or outside the processor 2011, 2021, and may be coupled to the processor 2011, 2021 by using various well-known means. Also, the eNB 2010 and/or UE 2020 may have a single or multiple antennas.

The embodiments described above are combinations of constituting elements and characteristics of the present invention in a predetermined manner. Each individual constituting element or characteristic has to be considered to be selective unless otherwise explicitly stated. Each individual constituting element or characteristic may be implemented so that it is not combined with other constituting elements or characteristics. Also, the embodiment of the present invention may be implemented by combining part of the constituting elements and/or characteristics. The order of operations described in the embodiments of the present invention may be changed. Part of the structure or characteristics of one embodiment may be included in a different embodiment or replaced with the corresponding structure or characteristics of the different embodiment. It is apparent that an embodiment may be constructed by combining those claims not explicitly referencing to each other within the technical scope of the present invention or included as a new claim by amendment after patent application.

The embodiments of the present invention may be implemented by various means, for example, hardware, firmware, software, or a combination thereof. In the case of hardware implementation, one embodiment of the present invention may be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processor, controller, micro-controller, and micro-processor.

In the case of software implementation, one embodiment of the present invention may be implemented in the form of a module, procedure, or function which performs the function or operations described above. Software codes may be executed by a processor stored in the memory. The memory may be located inside or outside the processor and may exchange data with the processor by using already-known various means.

It should be clearly understood by those skilled in the art that the present invention may be embodied in a different specific form as long as the embodiment does not lose essential characteristics of the present invention. Therefore, the detailed descriptions above may not be interpreted as limiting the present invention in any aspects but should be regarded as being illustrative. The technical scope of the present invention should be determined according to rational interpretation of appended claims, and all changes within the equivalent scope of the present invention should be included in the technical scope of the present invention.

INDUSTRIAL APPLICABILITY

A scheme for terminal clustering in a wireless communication system according to the present invention has been illustrated as being applied to a 3GPP LTE/LTE-A system, but may be applied to various wireless communication systems in addition to the 3GPP LTE/LTE-A system.

The invention claimed is:

1. A method for a User Equipment (UE) to perform UE clustering in a wireless communication system supporting D2D (Device-to-Device) communication, comprising:
   determining an initial preference value;
   determining an initial preference triplet by performing an AP (Affinity Propagation) method by increasing or decreasing the preference value;
   updating a preference triplet through a GSS (Golden Section Search) method based on the initial preference triplet;
   determining a final preference value for minimizing energy consumption of the entire UEs from the updated preference triplet; and
   determining a head UE and member UEs belonging to the head UE by performing the AP method by using the final preference value.

2. The method of claim 1, wherein whether to increase or decrease the preference value is determined by comparing energy consumption of the entire UEs according to the initial preference value with energy consumption of the entire UEs according to a value obtained by adding an amount of change to the initial preference value.

3. The method of claim 1, wherein the initial preference triplet is determined if an increased or decreased current preference value is larger than a previous preference value.

4. The method of claim 1, wherein a preference value is derived through the GSS method based on the initial preference triplet, and the preference triplet is updated based on a result of performing the AP method using a preference value derived through the GSS method and the initial preference triplet.

5. The method of claim 4, wherein the final preference value is determined if a difference between the maximum and the minimum preference values of the updated preference triplet is smaller than a value obtained by applying a predetermined termination threshold to the difference between a middle preference value of the updated preference triplet and the preference value derived through the GSS method.

6. The method of claim 1, wherein energy consumption of the entire UEs is the sum of the energy consumed in a head UE and the energy consumed for communication between the head UE and member UEs belonging to the head UE.

7. The method of claim 1, wherein the initial preference value is determined by the value for generating the number of initial clusters determined in advance by the AP method.

8. The method of claim 7, wherein the number of initial clusters is determined by a size of total area, a maximum distance between a head UE and member UEs within a cluster, and a maximum distance between head UEs.

9. A User Equipment (UE) performing UE clustering in a wireless communication system supporting 020 communication, comprising: and an RF (Radio Frequency) transceiver transmitting and receiving a wireless signal; a processor controlling the RF transceiver, wherein the processor is configured to determine an initial preference value, to determine an initial preference triplet by performing an AP (Affinity Propagation) method by increasing or decreasing the preference value, to update a preference triplet through a GSS (Golden Section Search) method based on the initial preference triplet, to determine a final preference value for minimizing energy consumption of the entire UEs from the updated preference triplet, and to determine a head UE and member UEs belonging to the head UE by performing the AP method by using the final preference value.

* * * * *